(12) United States Patent
Otose

(10) Patent No.: US 7,012,849 B2
(45) Date of Patent: Mar. 14, 2006

(54) SEMICONDUCTOR, IMAGE OUTPUT DEVICE, AND DRIVING METHOD OF A FUNCTIONAL DEVICE

(75) Inventor: Tomohiko Otose, Tokyo (JP)

(73) Assignee: Nec Corporation, Tokyo (JP)

( * ) Notice: Subject to any disclaimer, the term of this patent is extended or adjusted under 35 U.S.C. 154(b) by 152 days.

(21) Appl. No.: 10/619,594

(22) Filed: Jul. 16, 2003

(65) Prior Publication Data

US 2004/0013019 A1 Jan. 22, 2004

(30) Foreign Application Priority Data

Jul. 19, 2002 (JP) .............................. 2002-211825

(51) Int. Cl.
*G11C 11/00* (2006.01)

(52) U.S. Cl. ............ 365/222; 365/230.01; 365/189.01; 345/98; 345/545; 345/547; 345/560

(58) Field of Classification Search ................ 365/222, 365/189.01, 230.01; 345/98.545, 547, 560
See application file for complete search history.

(56) References Cited

U.S. PATENT DOCUMENTS

| | | | | |
|---|---|---|---|---|
| 4,787,040 A | * | 11/1988 | Ames et al. ................... 701/1 |
| 4,819,038 A | * | 4/1989 | Alt .............................. 257/10 |
| 4,964,699 A | * | 10/1990 | Inoue .......................... 345/98 |
| 5,644,758 A | * | 7/1997 | Patrick et al. ............... 345/562 |
| 5,801,720 A | * | 9/1998 | Norrod et al. ............... 345/568 |
| 5,961,617 A | * | 10/1999 | Tsang .......................... 710/100 |
| 6,002,846 A | * | 12/1999 | Okamoto ..................... 358/1.16 |
| 6,094,282 A | * | 7/2000 | Hoda et al. .................. 358/401 |
| 6,196,670 B1 | * | 3/2001 | Saruta ........................... 347/86 |
| 6,219,149 B1 | * | 4/2001 | Kawata et al. ............. 358/1.15 |
| 6,233,698 B1 | * | 5/2001 | Sakuma ......................... 714/7 |
| 6,236,427 B1 | * | 5/2001 | Roylance et al. ........... 347/249 |
| 6,326,943 B1 | * | 12/2001 | Inoue et al. ................ 345/101 |
| 6,426,765 B1 | * | 7/2002 | Iwasaki et al. .............. 347/12 |
| 6,462,998 B1 | * | 10/2002 | Proebsting ................. 365/205 |
| 6,582,980 B1 | * | 6/2003 | Feldman et al. ............. 438/28 |
| 6,788,179 B1 | * | 9/2004 | Holler et al. ................ 336/90 |
| 6,831,624 B1 | * | 12/2004 | Harrold ....................... 345/98 |
| 6,836,272 B1 | * | 12/2004 | Leung et al. ............... 345/540 |
| 6,850,214 B1 | * | 2/2005 | Nishitani et al. ............. 345/87 |

FOREIGN PATENT DOCUMENTS

JP 411091084 A * 4/1999

* cited by examiner

*Primary Examiner*—Viet Q. Nguyen
(74) *Attorney, Agent, or Firm*—Young & Thompson

(57) ABSTRACT

The invention provides a semiconductor device of low power consumption and low cost.

A semiconductor device 50 is basically constituted of a semiconductor substrate 1 and an external signal processing substrate 8. The semiconductor substrate 1 is provided with a memory unit 3, a data driver 4, an element array 2, a scanning circuit 35 and a clock generator 36. When successively outputting an identical data signal to the element array 2 over a plurality of times, the data signal retained in the memory unit 3 is utilized.

29 Claims, 17 Drawing Sheets n-ch     p-ch   SWITCH TFT   CAPACITOR   PIXEL ELECTRODE

SEMICONDUCTOR, IMAGE OUTPUT DEVICE, AND DRIVING METHOD OF A FUNCTIONAL DEVICE

This application is based on Japanese patent application NO. 2002-211825, the content of which is incorporated hereinto by reference.

BACKGROUND OF THE INVENTION

1. Field of the Invention

The present invention relates to a technique for reading out a data signal from a memory unit and driving a functional device.

2. Description of the Related Art

Reference is made to a printer, as a popular example of reading out a data signal temporarily stored in a memory unit and driving a functional device. FIG. 26 is a block diagram showing a constitution of a popular printer provided with a semiconductor device for temporarily storing and reading out an electric signal.

FIG. 26 specifically shows a functional block diagram of a conventional inkjet printer for recording a letter or an image by firing a minute droplet of ink such that the ink droplet flies and sticks onto a recording medium such as a paper sheet.

The inkjet printer is provided with a main body including a substrate 105 and a printhead 100 installed therein. The printhead 100 is provided with a driving circuit 101, an ink tank 102 and an injector 103. The substrate 105 comprises a memory unit 106 and a data signal providing unit 104.

Ink liquid is supplied from the ink tank 102 to the injector 103 through a prescribed flow path. A driving signal for activating the injector 103 is generated at the driving circuit 101 when a data signal output from the data signal providing unit 104 is input to the driving circuit 101, and input to the injector 103. Upon receipt of the driving signal the injector 103 fires an ink droplet. A conventional inkjet printer is provided with a plurality of nozzles for firing the ink droplets, but printing quality may sometimes deteriorate because of uneven performance of the nozzles resulting from a manufacturing fault etc. For preventing this problem a conventional inkjet printer is designed to perform a firing operation so called a "multi-pass mode".

The multi-pass printing operation shall be described referring to FIGS. 27 and 28. FIGS. 27 and 28 respectively show an example of a multi-pass printing operation. Referring to FIG. 27, the printhead 100 repeats firing actions while moving in a rightward direction from a start position 111. In this case, during a rightward motion and a leftward motion respectively, the printhead 100 fires ink droplets either to an identical point or to a different point shifted by a predetermined distance, over a portion indicated as a multi-pass printing region 110. When the printhead 100 reaches an end position 112 it moves downward to a transition position 113. Then the printhead 100 repeats firing actions moving in a leftward direction. Meanwhile referring to FIG. 28, the printhead 100 repeats firing actions moving back and forth over the multi-pass printing region 110 until it reaches the transition position 113, after which the printhead 100 repeats similar actions. In both of these cases, ink droplets fired from different nozzles fall on an identical point in the multi-pass printing region 110, therefore even if uneven injection is caused in the injector 103 the unevenness can be leveled off and corrected by overlapping the ink droplets or placing the ink droplets with a certain shift.

For performing such multi-pass operation, the memory unit 106 of a conventional inkjet printer shown in FIG. 26 stores at least a data signal necessary for printing on the multi-pass region 110. Generally, data in the memory unit 106 is read out by inputting an address signal to the memory unit 106 from a host device (not shown). Here, the address signal stands for a signal that serves for designating a memory cell stored in the memory unit 106 in a form of a matrix array, which signal may designate either a single memory cell or a plurality of memory cells, and further be a combination of an address signal of a leading memory cell and a signal indicating a number of the memory cells, therefore address signals in accordance with a system constituting the memory unit 106 shall be herein referred to as an address signal as a whole. The data signal read out from the memory unit 106 is transmitted to the driving circuit 101 on the printhead 100 through the data signal providing unit 104, and transmitted from the driving circuit to the injector 103, so that the injector 103 performs a firing action in response to an instruction of the driving circuit 101. This operation is repeated until firing actions for the entire multi-pass region are completed.

These days there is a growing demand in the field of inkjet printer for a higher speed printing performance and higher print quality. In order to fulfill such requirements, remedies such as increasing a number of nozzles or operating frequency of a printhead must be taken. Since such measures naturally lead to an increase of data signals for printing, performance level of circuits on the substrate 105 in the printer main body or the driving circuit 101 of the printhead 100 etc. in FIG. 26 has to be upgraded. Also, with an increase of a number of nozzles some measures must be taken for preventing variation of ink droplet volume to be fired from each of the nozzles. For these reasons the correction is executed by the multi-pass printing, to achieve a high quality print by an inkjet printer. However, in case where the multi-pass printing is to be performed on a conventional printer as shown in FIG. 26, identical data signals have to be transmitted over a plurality of times from the memory unit 106 through the data signal providing unit to the driving circuit 101, which inevitably results in an increase of power consumption and a higher cost of the printer, in exchange with a quicker operation and higher quality of its printing job.

The foregoing problem is not limited to an inkjet printer, but is common to other semiconductor devices in which a data signal read out from a memory unit, or another signal generated based on such data signal is to drive an active element, and besides the same data signal is repeatedly required for each driving cycle. In such a case accordingly, a similar problem to the case of the inkjet printer arises as a result of a quicker action or higher performance level of a semiconductor device. Specifically, an increase of operation frequency leads to increased power consumption, or achieving a higher performance of the data signal providing unit 104 results in a cost increase.

The invention has been made in view of the foregoing situation, with an object to restrain an increase of power consumption of a semiconductor device. It is another object of the invention to restrain a cost increase due to upgrading a performance level of a semiconductor device. Also, it is another object of the invention to restrain a power consumption increase arising from upgrading a performance level of a printer. It is still another object of the invention to restrain a cost increase due to upgrading a performance level of an image output device.

SUMMARY OF THE INVENTION

An aspect of the present invention provides a semiconductor device, comprising a memory unit having a plurality of addresses for temporarily storing a data signal; a data signal providing unit for providing the data signal to the memory unit; a driving unit for generating a control signal for controlling a functional element based on the data signal read out from the memory unit and providing the control signal to the functional element; and a data-update control unit for successively providing an identical data signal over a plurality of times from an identical address in the memory unit.

The data-update control unit may cause the data signal providing unit to suspend the operation of providing a data signal or shut off a data signal transmission route from the data signal providing unit to the memory unit, in order to keep the data signal stored in the memory unit from being updated when successively providing the identical data signal to the functional element.

Here, "suspend data signal providing operation" may include a case of restricting the data signal providing unit from outputting a data signal to the memory unit, and of restricting the generation of the data signal to be provided in a region of the memory unit where the data signal is not updated. Also, "shut off a transmission route" may be executed by providing a switching device between the data signal providing unit and the memory unit, and turning it off. The switching device may be provided arbitrarily whether on the data signal providing unit side, or on the driving unit for driving the memory unit, though in general it is more advantageous to provide on the data signal providing unit side from the viewpoint of reducing power consumption.

Since an identical data signal is successively provided to the functional element over a plurality of times by successively reading out the data signal over a plurality of times from an identical address in the memory unit, transmission of a data signal from a host device to the memory unit becomes unnecessary during such operation, therefore power consumption of the semiconductor device is expected to decrease. Also, since an identical data signal is successively utilized for the functional element a transmission frequency of a data signal from a host device can be reduced, by which cost-down is expected. Further, a region where the data signal successively read out from the memory unit is to be stored may be an entire region of the memory unit or a portion thereof.

Here, the functional element stands for an element to be controlled with a data signal temporarily stored in the memory unit, such as an active element, optical element, switching element, etc. Also, a number of such functional elements may be arbitrarily determined. Also, the functional element may constitute an element array including a plurality of functional elements. As an example of a device in which an element array is incorporated, an active matrix type display unit can be cited. Further, the data signal is not limited to an electric signal, which is popularly employed, but an electromagnetic wave such as light can also be employed. In other words, as long as a signal can be transmitted, the transmission medium is not a question. In addition, as the memory unit, for example a RAM (Random Access Memory) can be employed.

Another aspect of the invention also provides a semiconductor device. This semiconductor device comprises a memory unit having a plurality of addresses for temporarily storing a data signal; a driving unit for selecting a control signal input from outside for controlling a functional element based on the data signal read out from the memory unit and providing the control signal to the functional element; and a data-update control unit for successively providing an identical signal over a plurality of times from an identical address in the memory unit.

Still another aspect of the invention also provides a semiconductor device. This semiconductor device comprises a memory unit having a plurality of addresses for temporarily storing a data signal; a first driving unit for outputting to a functional element a signal for selecting, based on the data signal read out from the memory unit, a control signal input from outside for controlling the functional element; a second driving unit for providing the control signal to the functional element; and a data-update control unit for successively providing an identical signal over a plurality of times from an identical address in the memory unit.

In the semiconductor device in these aspects, the driving unit and the memory may constitute a combined unit. In case where the memory unit and the driving unit are provided on a same substrate, since connecting means such as a cable is not required a transmission loss that may take place on a cable etc. can be minimized. Consequently an output level of the signal can be lowered, which leads to lower power consumption and lower cost. In the semiconductor device in these aspects, the driving unit and the functional element may constitute a combined unit. In this case also, since the driving unit and the functional elements are mounted on the same substrate there is no need of employing connecting means such as a cable, which results in a minimized transmission loss that may be incurred on a cable etc. As a result, an output level of the signal can be lowered, which leads to lower power consumption and lower cost. In the semiconductor device of these aspects, the memory unit, the driving unit and the functional element may constitute a combined unit. In this case also, since the memory unit, the driving unit and the functional elements are mounted on the same substrate, similar advantage to the foregoing passage can be attained. Further, the data-update control unit may also be installed on the same substrate.

The semiconductor device of the foregoing aspect may further comprise a first signal transferring unit for transferring the data signal to the memory unit from a host device that provides the data signal to the semiconductor device; a second signal transferring unit for transferring the data signal from the memory unit to the driving unit; and the second signal transferring unit may be set shorter than the first transferring unit. As a result, for example in case where the semiconductor device is provided with a first signal transferring unit for transferring an electric signal by electrically connecting a host device and a memory unit and a second signal transferring unit for transferring the electric signal by electrically connecting the memory unit and driving mans, since a length of the second signal transferring unit is shorter than that of the first signal transferring unit, a loss that may be incurred while repeatedly transferring electric signals stored in the memory unit to the functional element can be restrained. Reducing a loss of the electric signal enables restriction of an amplitude of the data signal to be output, thereby reducing power consumption.

The semiconductor device of the foregoing aspect may further comprise a level converter for converting an amplitude of the data signal input into the memory unit to a desired amplitude. By such an arrangement, it becomes possible for example to set an input signal at a low voltage and then to output the signal at a higher voltage through a level converter such as an amplifier, in which case since the signal is driven by a lower voltage over a longer signal path, power consumption can be reduced. Further, the level converter may also be installed on the same substrate.

Also, the data signal to be input to the semiconductor device may be a serial signal, in which case the semiconductor device of the foregoing aspect may further comprise a serial/parallel converter (hereinafter simply referred to as "S/P conversion") for converting the input serial data signal into a parallel signal. Because of the S/P converter, for example when a signal data can be input into a plurality of functional elements at a time in a form of serial signal, a number of external connection terminals for connection with a host device can be reduced. As a result, a yield in manufacturing process can be improved, and thereby manufacturing cost can be reduced.

The semiconductor device of the foregoing aspect may further comprise a phase expanding unit for converting an O-phase parallel signal to a P-phase parallel signal. Here, O and P are natural numbers and P is greater than O. As a result of providing the phase expanding unit in the semiconductor device, a signal having a phase of a less number than is required in the semiconductor device, for example an O-phase parallel signal which is less than a P-phase can be input, therefore the number of external connection terminals for connection with a host device can be reduced.

The semiconductor device of the foregoing aspect may further comprise latching means for latching an output of the data signal from the S/P converter. By the latching means it becomes possible to temporarily store the parallel signal output from the S/P converter and to output it at a desired timing.

The semiconductor device of the foregoing aspect may further comprise latching means for latching an output of the data signal from the phase expanding unit. By such latching means it becomes possible to temporarily store the O-phase parallel signal output from the phase expanding unit and to output it at a desired timing.

In the semiconductor device of the foregoing aspect, at least one of circuits constituting the driving unit, the first signal transferring unit, the memory unit and the second signal transferring unit may be constituted of a thin film transistor (hereinafter simply referred to as "TFT"). In case where the circuits are constituted of TFT, for example a glass substrate having a large area can be employed, which allows a large-scaled device formation. On the other hand, in case of employing a small-area device, since a more number of substrates can be distributed when simultaneously forming substrates for a plurality of devices on the large-area substrate, the cost can be reduced.

In case where the driving unit, the memory unit and the functional element are formed in a combined unit, generally in a form of TFT on a same substrate, an output from the memory unit can be made parallel by integrating the elements constituting the circuit. In this case the phase expanding unit is not necessary, therefore a further micronization of the device can be achieved.

A semiconductor layer of the TFT may be constituted of polycrystalline silicon. As a result of forming the TFT semiconductor layer with polycrystalline silicon, it becomes possible for example to provide various functional circuits on a large-area glass substrate.

The functional element may be an active element or an optical element, or an element that physically deforms by a control signal, or further an element a heat generated whereby is controlled by a control signal. Furthermore, the functional element may be the injector for firing a droplet wherein a control signal may control an amount of the droplet to be fired.

Examples of an active element may include a piezoelectric element or a ceramic element, or a resistance element such as a heater. As an optical element, for example an EL (electro-luminescence) element or a liquid crystal element may be employed.

Still another aspect of the invention provides an image output device. The image output device comprises a memory unit for temporarily storing a data signal to be provided to the injector for firing a droplet; a driving unit for reading out the data signal stored in the memory unit, generating a control signal by which to control the injector and driving the injector based on the control signal, and a data-update control unit for shutting down an input path of the data signal to the memory unit when successively providing the identical control signal to the injector, so that the memory unit does not update the signal stored therein.

Still another aspect of the invention also provides an image output device. The image output device is provided with an injector for firing a droplet for printing, and comprises a memory unit for temporarily storing a data signal to be provided to the injector; a driving unit for reading out the data signal stored in the memory unit, generating a control signal by which to control the injector and driving the injector based on the control signal; and a data-update control unit for causing a data signal providing unit to suspend outputting the data signal to the memory unit when successively providing the identical control signal to the injector over a plurality of times, so that the memory unit does not update the data signal stored therein.

Still another aspect of the invention also provides an image output device. The image output device is provided with an injector for firing a droplet for printing, and comprises a memory unit for temporarily storing a data signal for selecting a driving waveform to be provided to the injector; and a driving unit for reading out the data signal stored in the memory unit, selecting the driving waveform input from outside based on the data signal and driving the injector based on the driving waveform.

The driving unit and the memory unit may constitute a combined unit. Also, the driving unit and the functional element may be unified, and further the driving unit, the injector and the memory unit may be combined to form a unit.

The memory unit may be installed on a transmission route of the data signal from a host device that provides the data signal to the image output device to the driving unit.

The image output device of the foregoing aspect may further comprise a first signal transferring unit for transferring the data signal to the memory unit from a host device that provides the data signal to the image output device; a second signal transferring unit for transferring the data signal from the memory unit to the driving unit; and the second signal transferring unit may be set shorter than the first transferring unit.

The image output device of the foregoing aspect may further comprise a level converter for converting an amplitude of the data signal input into the image output device to a desired amplitude. Generally an amplifier is employed as the level converter. Also, the level converter may be formed on the same substrate.

Also, the data signal to be input to the image output device may be a serial signal, and the image output device of the foregoing aspect may further comprise an S/P converter for converting the input serial data signal into a parallel signal.

The image output device of the foregoing aspect may further comprise a phase expanding unit for converting an O-phase parallel signal to a P-phase parallel signal. Also, the image output device of the foregoing aspect may further comprise latching means for latching an output of the data signal from the S/P converter. The semiconductor device of the foregoing aspect may further comprise latching means for latching an output of the data signal from the phase expanding unit.

At least one of circuits constituting the driving unit, the first signal transferring unit, the memory unit and the second signal transferring unit may be constituted of a TFT. A semiconductor layer of the TFT may be constituted of polycrystalline silicon.

According to the image output device of the foregoing aspect, since the first signal transferring unit and the memory unit, or the second signal transferring unit and the memory unit are formed on a same substrate through a same manufacturing process, cost reduction can be achieved because of an improved throughput.

Also, by forming a control circuit for a printhead and a part of the injector of ink for printing on a glass substrate, the printhead can be made in reduced dimensions. Consequently, a main body of a printing apparatus can be made more compact, and higher degree of designing freedom can be attained.

The injector may include a piezoelectric element or a ceramic element that physically deforms by a control signal. Also, the injector may include a resistance element a heat generated whereby is controlled by a control signal. A system in which a piezoelectric element is used in the injector is generally called as piezoelectric inkjet system, while a system in which a resistance element is used is called as thermal inkjet system.

As a result of the foregoing arrangement, with respect to an image output device that can achieve a desired output repeatedly utilizing an identical data signal, lower power consumption and lower cost can be achieved.

Furthermore, still another aspect of the invention provides driving method of a functional element. The driving method comprises the steps of temporarily storing in a memory unit a data signal for controlling a functional element; reading out the data signal and transferring it to the functional element; transferring a data signal for controlling the functional element from an identical address of the memory unit instead of updating the data signal stored therein, in case where it is predetermined that an identical data to that stored in the memory unit is to be successively used.

Still another aspect of the invention provides manufacturing method of a semiconductor device. By the manufacturing method, a TFT circuit including a memory unit for temporarily storing a signal for controlling an element array, the element array and a driving unit for driving the element array is formed on a same insulating substrate through a same process. Here, the insulating substrate may be a glass substrate.

Still another aspect of the invention provides manufacturing method of an image output device, specifically manufacturing method of a printhead provided in the image output device, comprising the steps of forming on a same insulating substrate a TFT circuit including a memory unit for temporarily storing a control signal for an ink injector provided in the printhead, an injector and a driving unit for driving the injector, through a same process. Here, the insulating substrate may be a glass substrate.

In addition, it is to be understood that an arbitrary combination of any of the foregoing element, or variation of the expression of the invention with respect to method, device, system or recording medium, etc. is duly effective as an aspect of the invention.

DESCRIPTION OF THE PREFERRED EMBODIMENTS

Now referring to the accompanying drawings, the present invention shall be described based on various embodiments. In the embodiments A1 through A9, the invention is embodied as a semiconductor device. The semiconductor device comprises an element array constituted of a matrix array of functional elements, a memory unit for temporarily storing a data signal to be input to the element array and a driving circuit for driving the functional element. Here, in case where an identical data signal is successively input to a same functional element, data updating in the element array is suspended and the stored data signal is repeatedly used, so that power consumption can be reduced. Also, by unifying the functional element, the memory unit and the driving circuit into a combined unit, overall dimensions of the device can be made smaller. Further, the embodiment B1 relates to an image output device, the embodiment B2 to a display device and the embodiment B3 to an optical switching device.

Embodiment A1

Figure 1:
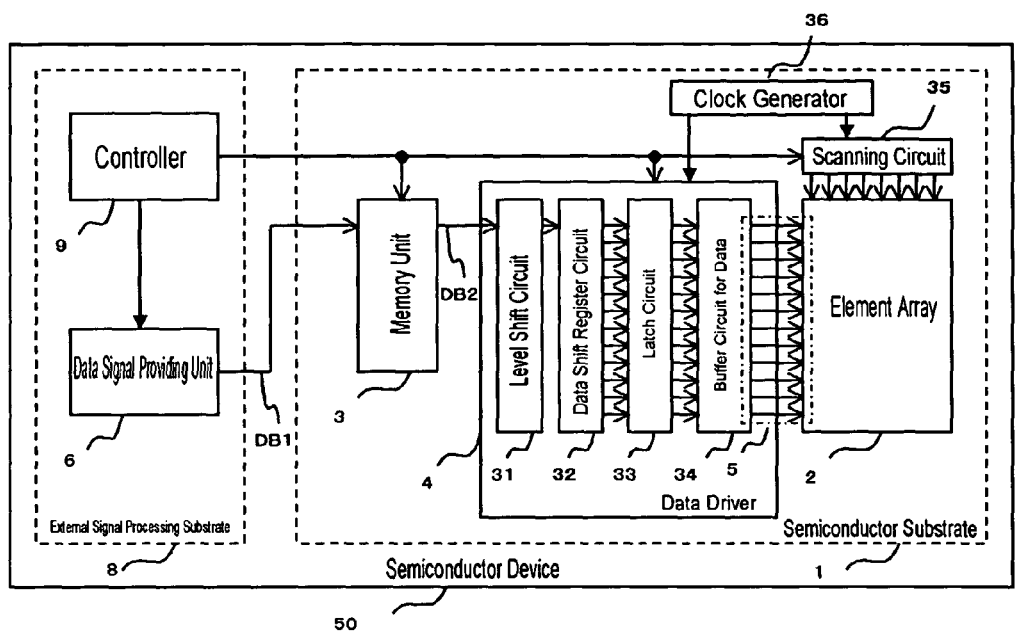
FIG. 1 is a block diagram showing a configuration of a semiconductor device according the embodiments A1 and A2 of the present invention.

FIG. 1 is a block diagram showing a configuration of a semiconductor device 50 according the embodiments A1. The semiconductor device 50 comprises a semiconductor substrate 1 and an external signal processing substrate 8.

The semiconductor substrate 1 is provided with a memory unit 3, a data driver 4, an element array 2, a scanning circuit 35 and a clock generator 36. The scanning circuit 35 controls a scanning timing in a horizontal direction when inputting a data signal to the element array 2. The clock generator 36 generates a clock signal that serves as a reference for determining a scanning timing. The external signal processing substrate 8 is provided with a data signal providing unit 6 and a controller 9.

The data driver 4 is provided with a level shift circuit 31, a data shift register circuit 32, a latch circuit 33 and a data buffer circuit 34.

The level shift circuit 31 converts an amplitude of the data signal. Because of such function, an amplitude of the data signal to be transferred from the external signal processing substrate to the memory unit 3 can be set at a relatively small value. Therefore, an appropriate data amplitude can be set for transference from the external data processing substrate 8 to the memory unit 3, or from the memory unit 3 to the data driver 4. As a result unnecessary power consumption can be minimized.

The data shift register circuit 32 converts a serial signal input to the data driver 4 into a parallel signal. The latch circuit 33 temporarily retains the data signal and outputs it at a desired timing. The data buffer circuit 34 shapes a waveform of the data signal output from the latch circuit and transfers it to the element array. Accordingly, the data signal input from the memory unit 3 is sequentially transferred through the level shift circuit 31, data shift register circuit 32, latch circuit 33 and the data buffer circuit 34, to be output to the element array 2.

Here, the data signal stands for a digital signal for controlling the element array 2. Also, the data driver 4 transfers the data signal output from the memory unit 3, to the element array 2.

Also, the element array 2 shall be defined as a two-dimensional array aligned in M lines by N rows constituted of functional elements to be controlled by the data signal input through the data bus line 5. In the configuration shown in FIG. 1, the element array is constituted of 12 lines by 8 rows. Accordingly, the data bus line 5 has 12 lines.

The functional elements include, for example, a transistor serving as a switch, a piezoelectric element that physically deforms by applying an electric field, and an active element such as a resistance element that serves as a heat source that causes a temperature variation by an electric signal, etc. Further, the functional elements also include optical elements such as an EL element or liquid crystal element, and an optical switch, etc.

The controller 9 controls at least the memory unit 3, the data driver 4 and the data signal providing unit 6. Meanwhile, the configuration shown in FIG. 1 is no more than an example, and while the controller 9 is disposed in the external signal processing substrate 8, it can be disposed on the side of the semiconductor substrate 1 as an alternative configuration.

Now, a transmission route connecting the data signal providing unit 6 and the memory unit 3 is denoted as a first transmitter DB1, and a transmission route connecting the memory unit 3 and the data driver 4 is denoted as a second transmitter DB2. In this embodiment, since the second transmitter DB2 is provided in the semiconductor device 50, the second transmitter DB2 is shorter than the first transmitter DB1. In general, the longer a transmission route is, the greater transmission loss tends to be incurred. Therefore, in this embodiment in which the data signal is repeatedly output over a plurality of times from the memory unit 3, power consumption can be lowered since the second transmitter DB2 is shorter.

The data signal providing unit includes a switching circuit which is not shown, and turns off the switching circuit when successively transferring the data signal stored in the memory unit 3 without updating to the element array 2. By this action updating of the data signal in the memory unit 3 is suspended. This switching circuit may be installed on the side of the memory unit 3, however it is more advantageous to provide the switching circuit on the side of the data signal providing unit 6 from a viewpoint of reduction of power consumption, because the signal is not input to the route connecting the memory unit 3 and the data signal providing unit 6.

Figure 2:
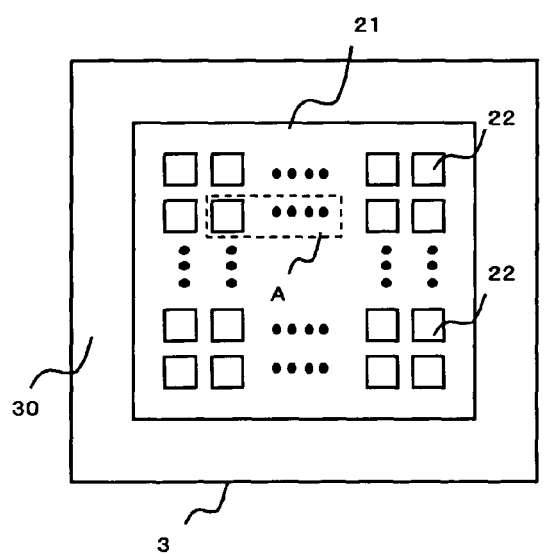
FIG. 2 is a block diagram showing a configuration of a memory unit according the embodiments A1 and A2 of the invention.

FIG. 2 shows a configuration of the memory unit 3. The memory unit 3 is provided with a memory cell array 21 composed of a plurality of memory cells aligned in a matrix form, and a memory driver 30 disposed around the memory cell array. The memory cell 22 is a memory element for retaining the data signal for a certain period of time.

The memory driver 30 performs by an instruction of the controller 9 a writing operation of the data signal on the memory unit 3 from the data signal providing unit 6, and a transferring operation of the data signal to the data driver 4

(Refer to FIG. 1). The configuration of the memory unit 3 referred to in the subsequent embodiments is the same as the memory unit 3 according to FIG. 2.

Figure 3:
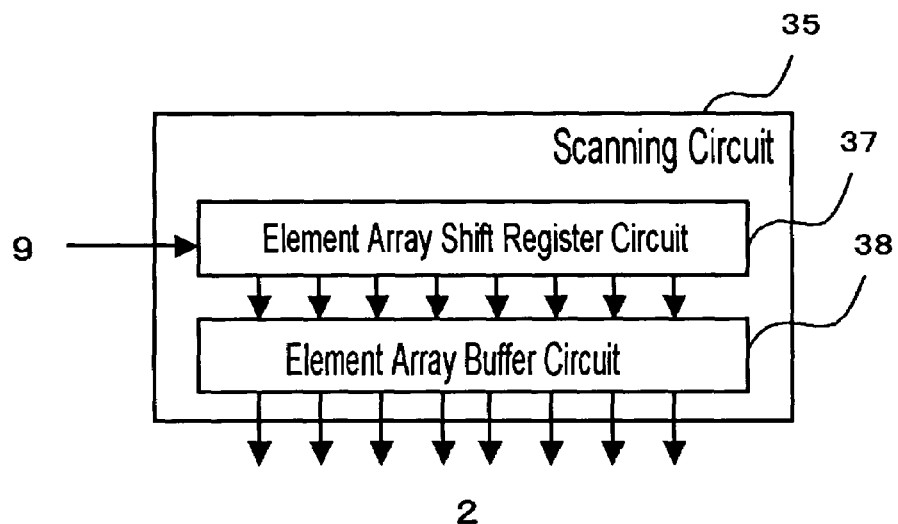
FIG. 3 is a block diagram showing a configuration of a scanning circuit according the embodiments A1 and A2 of the invention.

The memory driver 30 for driving the memory cell 22 in the memory unit 3 transfers the data signal retained in the memory cell 22 to the data driver 4 in a form of a serial signal. However, the memory driver 30 may convert the data signal into a P-phase parallel signal before transferring it to the data driver 4. FIG. 3 shows a configuration of the scanning circuit 35. The scanning circuit 35 is further provided with an element array shift register circuit 37 and an element array buffer circuit 38.

Figure 4:
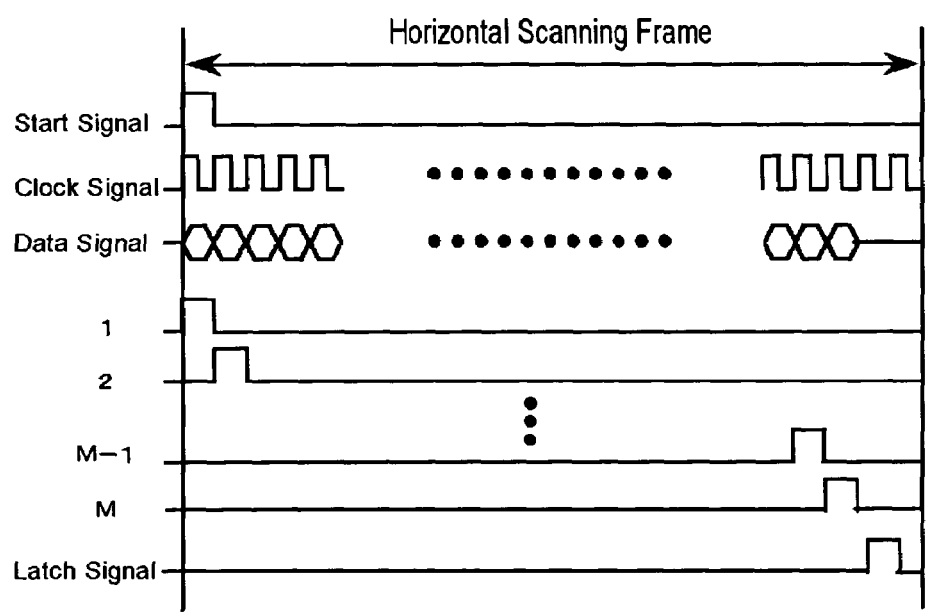
FIG. 4 is a timing chart showing an operation of a data driver according to the embodiments A1 and A2 of the invention.

FIG. 4 is a timing chart showing an operation of the data driver 4. A start signal, a clock signal and the data signal are sequentially shown from the top. Thereunder a signal for controlling M lines of data bus line 5 generated in the data shift register circuit 32 is shown, below which finally a latch signal is shown.

When the start signal rises to a high level the data signal, which is a serial signal, is expanded to a M-phase parallel signal by the data shift register circuit 32 according to the clock signal. At this step, transference of the data signal to the data buffer circuit 34 is temporarily retained at the latch circuit 33, until the data signal is completely expanded to the M-phase. Once the expansion of the data signal to the M-phase has been completed, the latch signal rises to a high level at a desired timing, and the data signal now expanded to a parallel signal is transferred to the data buffer circuit 34. Then, a prescribed horizontal scanning timing is reached, the data signal is output from the data buffer circuit 34 to the element array 2.

Figure 5:
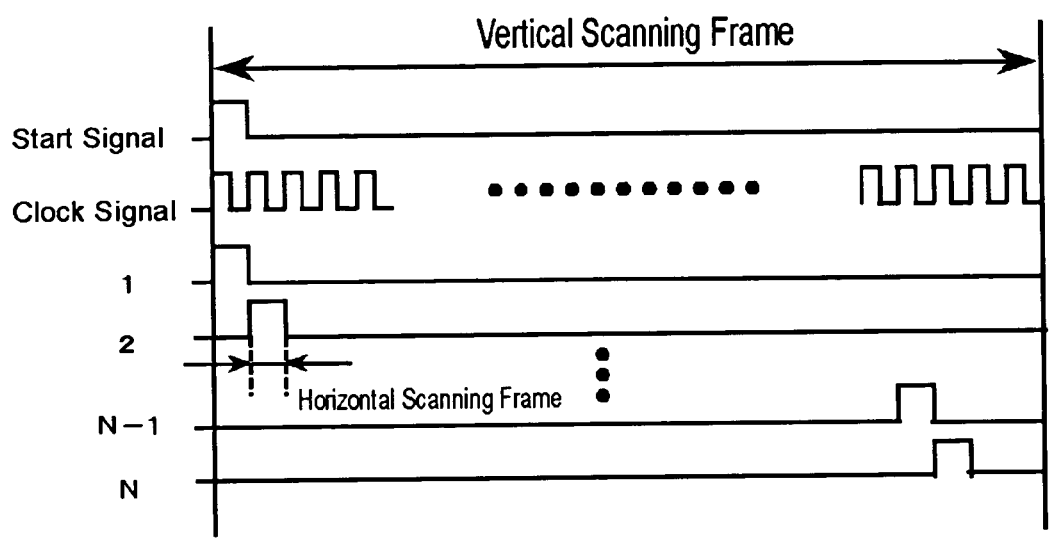
FIG. 5 is a timing chart showing an operation of the scanning circuit according to the embodiments A1 and A2 of the invention.

FIG. 5 is a timing chart showing an operation of the scanning circuit 35. A start signal, a clock signal and scanning signals for inputting the data signal to the functional elements in the first to Nth rows of the element array 2 are sequentially shown from the top.

When the start signal rises to a high level, the N rows of scanning lines sequentially extending from the left toward the element array 2 from the scanning circuit 35 are raised high by the element array shift register circuit 37, according to the clock signal. To the element in the row the scanning line whereof has become high, the data signal is output from the data buffer circuit 34.

Figure 6:
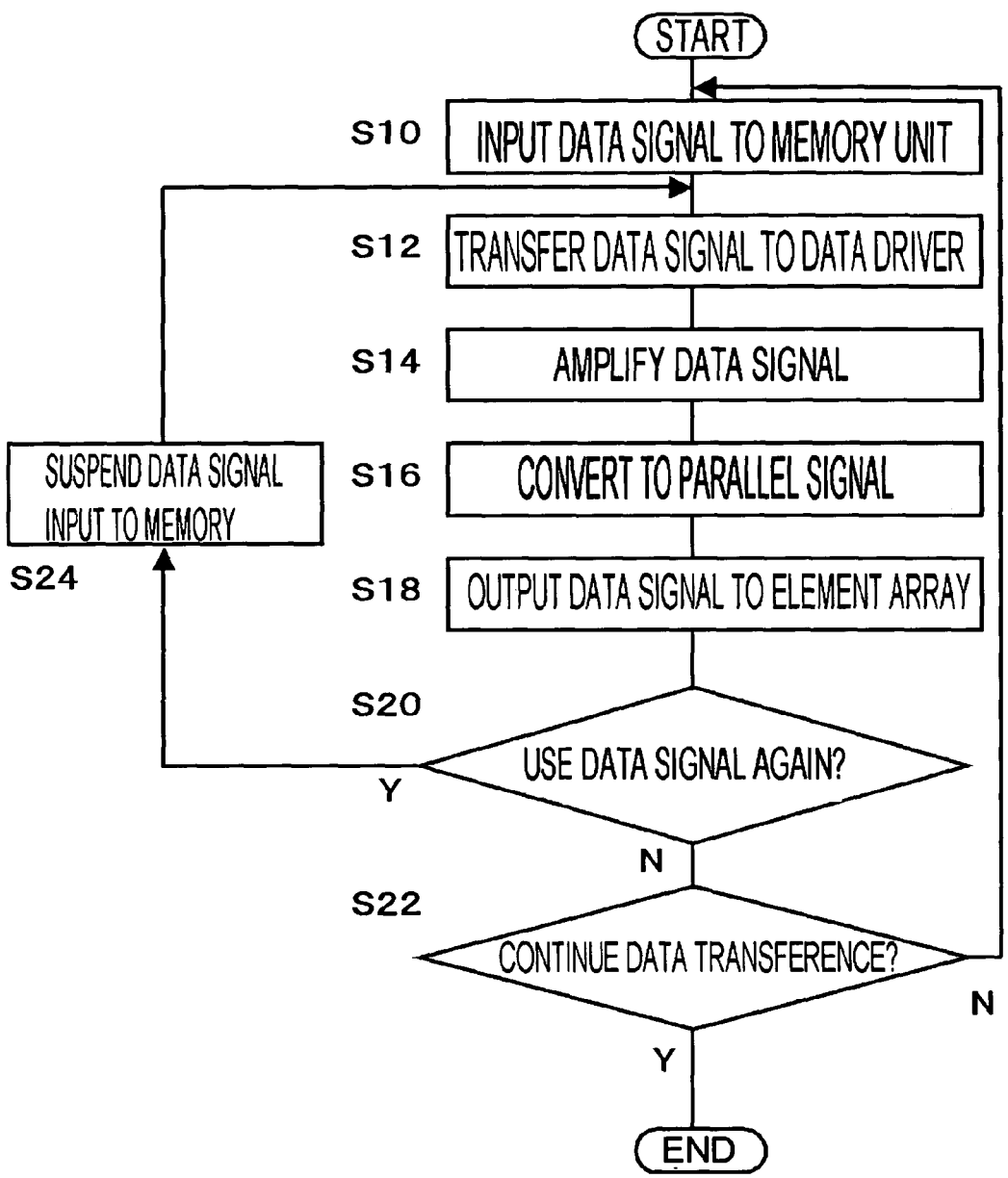
FIG. 6 is a timing chart showing data transference steps from data signal providing unit to an element array according to the embodiments A1 and A2 of the invention.

Now a flow of the data signal shall be described hereunder referring to the flow chart shown in FIG. 6. The data signal output from the data signal providing unit 6 is input to the memory unit 3 to be retained therein (S10). The data signal retained in the memory unit 3 is transferred to the data driver 4 (S12).

At this stage, for example in case where a data lies in a region A on the memory cell array 21 in FIG. 2, an address signal indicating such region is input to the memory driver 30, so that the data is sequentially read out from the memory cell in the region A, and is transferred to the data driver 4 through the memory driver 30. Here, the address signal stands for a signal that indicates a memory cell 22, and may indicate a single memory cell 22 or a plurality of memory cells 22, and may further be a combination of an address signal of a first memory cell 22 and a signal indicating a number of memory cells 22.

The data signal input to the data driver 4 is first amplified at the level shift circuit 31 (S14). Then the data signal, which has been a serial signal, is converted into a parallel signal at the data shift register circuit 32 (S16). The latch circuit 33 outputs the data signal at a prescribed timing to the element array 2 thorough the data buffer circuit 34 (S18).

In the element array 2, a functional element is controlled by the data signal transferred from the data driver 4, so that the element array 2 performs a desired operation. In case of operating the element array 2 by repeatedly providing the same data signal (Y of S20), the data signal providing unit 6 suspends the transference of the data signal to the memory unit 3 (S24), and the process as from S12 is executed. In case where the same data is not repeatedly used (N of S20), if the data signal providing unit 6 continues to transfer the data (N of S22) the process as from S10 is executed, and the data signal in the memory unit 3 is updated and a new data signal is transferred to the element array 2. In case of finishing the transference of the data signal (Y of S22), the entire process is finished.

According to the foregoing embodiment A1, lower power consumption and lower cost can be achieved with the semiconductor device 50, since the data transference is not performed between the data signal providing unit 6 and the memory unit 3, which constitutes a long transmission route of the data signal, and an operating frequency on the side of the external signal processing substrate 8 can be restrained. Also, since the data signal input to the memory unit 3 is amplified at the level shift circuit 31, power consumption of the data signal between the data signal providing unit 6 and the memory unit 3 can be restrained.

In this embodiment A1 the memory cells 22 serving as a functional element are aligned in an M by N matrix form, or two-dimensionally, while the memory cells 22 may be aligned in a row, or one-dimensionally. In this case the scanning circuit 35 is to be omitted.

Figure 7:
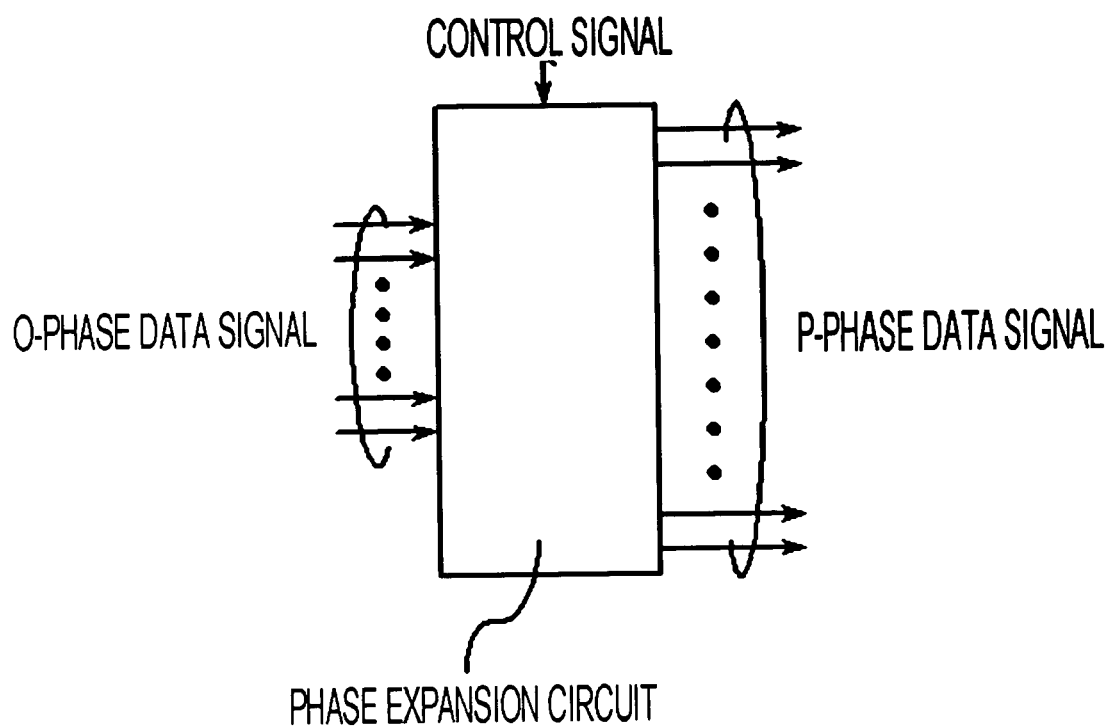
FIG. 7 is a block diagram showing a phase expanding circuit.

Also, the data driver 4 may include a phase expansion circuit for expanding, for example the O-phase parallel data signal to a P-phase signal (provided P is greater than O) as shown in FIG. 7, before or after an amplitude of the data signal is shifted at the level shift circuit 31. For example, in case where the element array 2 is converted into 4-phase of 2×2 regions, the scanning timing in a vertical and horizontal direction is slowed down to ½, in other words the operating frequency becomes ½. Consequently, further cost reduction is achieved.

Figure 8:
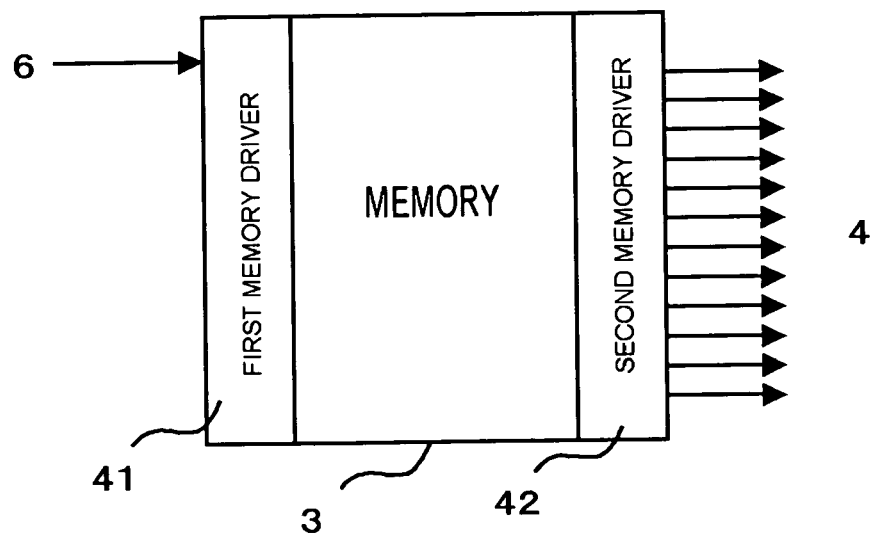
FIG. 8 is a block diagram showing a configuration of the memory unit in case where a parallel signal is output from the memory unit to the data driver.

FIG. 8 is a block diagram showing a configuration of the memory unit 3 in case where the data signal is output in a form of a parallel signal. In this case the memory unit 3 is provided with a first memory driver 41 having the same function as that of the memory driver 30 shown in FIG. 2 and a second memory driver 42 capable of performing S/P conversion. In addition, under such arrangement generally the data shift register 32 is omitted in the data driver 4.

Figure 9:
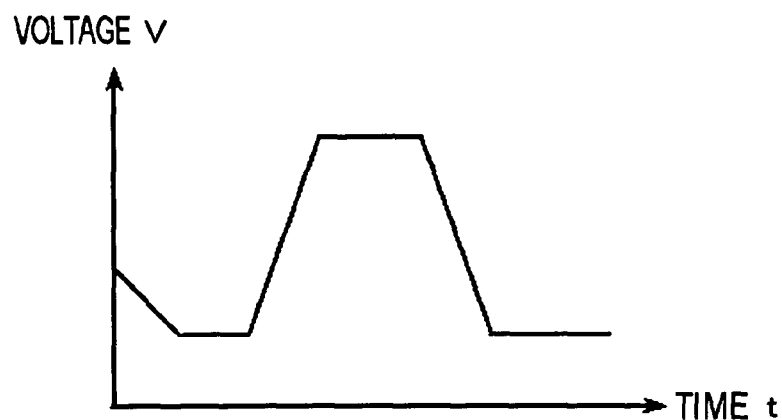
FIG. 9 is a timing chart of an analog signal.

Further, in the embodiment A1 the signal to be input to the element array 2 is a digital signal, while the signal can also be an analog signal for example in FIG. 9 in which a voltage V varies with a lapse of time t. In this case it is preferable to install a selection circuit for selecting the analog signal with the data signal on the way between the data shift register circuit 32 and the latch circuit 33. The selection circuit is also applicable to a case where a functional element constituting the element array 2, i.e. the memory cell 22 is controlled by the analog signal.

Embodiment A2

The constitution of the semiconductor according to this embodiment is identical to that of the embodiment A1, i.e. to the configuration shown in FIGS. 1 and 2. Therefore description on the constitution shall be omitted. Difference from the embodiment A1 lies in driving method, which shall be described hereunder.

Now, the memory unit 3 according to this embodiment A2 simultaneously performs a writing operation of causing a memory cell 22 to memorize and retain a data signal output from the data signal providing unit 6, and a reading-out operation of transferring a data signal retained by another memory cell 22 than the above memory cell 22 to the data driver 4.

A writing operation of the data signal on the element array 2 is performed each time the data signal is read out from the memory unit 3 and of transferred to the element array 2 through the data driver 4. At this point, the writing operation of the data signal is also executed on the memory unit 3, by the transference of the data signal from the data signal providing unit 6 to the memory unit 3. Accordingly, once a multi-pass printing operation has been completed, since the memory unit 3 retains the data signal necessary for the next step i.e. the data signal to be transferred from the memory unit 3 to the data driver 4, the reading-out operation of the data signal, i.e. transference of the data signal to the element array 2 through the data driver 4 can be immediately performed.

Also, since the data signal providing unit 6 is capable of transferring a data signal during the operation of the element array 2, a driving frequency during the data transference can be set relatively low. Therefore since the data signal providing unit 6 is not required to perform a high-speed operation, a low-cost semiconductor device can be attained. Further, since the driving frequency of the data signal providing unit 6 can be set relatively low, power consumption of the entire device can be lowered.

Embodiment A3

Figure 10:
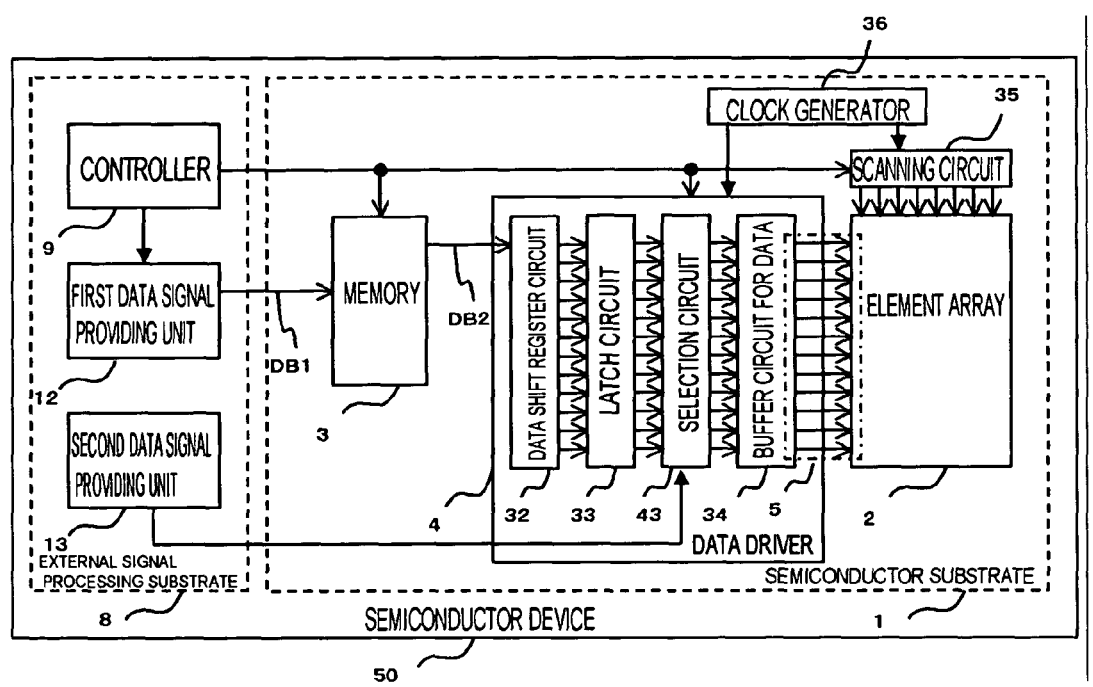
FIG. 10 is a block diagram showing a configuration of a semiconductor device according the embodiments A3 and A4 of the invention.

FIG. 10 is a block diagram showing a configuration of the semiconductor device 50 according the embodiments A3. A distinctive aspect from the semiconductor device 50 according to the embodiments A1 and A2 is that the data signal providing unit 6 in the external signal processing substrate 8 is substituted with a first data signal providing unit 12 and a second data signal providing unit 13. Here, the data signal providing unit 6 of the embodiment A1 outputs a digital signal. By contrast in this embodiment A3, the first data signal providing unit 12 outputs a first data signal that is a digital signal, while the second data signal providing unit 13 outputs a second data signal that is an analog signal. Also, the data driver 4 is provided with the data shift register circuit 32, the latch circuit 33, the selection circuit 43 and the data buffer circuit 34.

Now, the first data signal output from the first data signal providing unit 12 is a digital signal by which to select an analog signal to be provided to the element array 2. Also, the second data signal output from the second data signal providing unit 13 is a plurality of types of analog signals to be provided to the element array 2. Such second data signals, which are different for each functional element constituting the element array 2, respectively have a different waveform, which may be for example a constant voltage such as a gradation voltage for an LCD device or an analog waveform as shown in FIG. 9. The selection circuit 43 selects one or more analog signals designated by the first data signal, i.e. the second data signal. In case where a plurality of analog signals are designated, the selection circuit 43 merges the waveform of the selected analog signals and outputs to the element array 2 through the data buffer circuit 34.

Here, the memory unit 3 has the same configuration as that shown in FIG. 2 according to the embodiment A1. Also, the data driver 4 determines an electric signal to be output to the element array 2 based on the first data signal output from the memory unit 3 and the second data signal output from the second data signal providing unit 13, and transfers the electric signal to the element array 2. Further, the element array 2 is constituted of functional elements to be controlled by the electric signal input through the data bus line 5, aligned for example in a matrix form. Also the controller 9 serves to control the memory unit 3 and the data driver 4. Here, FIG. 10 is merely a single example of possible configurations, and the controller 9 for example, which is installed in the external signal processing substrate 8 in FIG. 10, can be installed on the side of the semiconductor substrate 1.

Consequently, according to the embodiment A3, a distinction from the embodiments A1 and A2 is that at least one analog signal is selected out of a plurality of analog signals according to the first data signal in the selection circuit 43, and is transferred to the element array 2, instead of transferring the data signal read out from the memory unit 3 to the element array 2.

The semiconductor device 50 according to the embodiment A3 provides similar advantage to that of the embodiments A1 and A2 that since transference of the data signal from the first data signal providing unit 12 to the memory unit 3 is suspended when an identical data is successively input to the element array 2 over a plurality of times, reduction of power consumption is expected during an operation of the semiconductor device 50. Also, an analog signal can be input to the element array 2.

Embodiment A4

The constitution of the semiconductor according to this embodiment is identical to that of the embodiment A3, i.e. to the configuration shown in FIG. 10. Since difference from the embodiment A3 lies in driving method, only the driving method of the semiconductor device shall be described hereunder, omitting description of the constitution.

Here, the memory unit 3 according to this embodiment A4 is capable of simultaneously performing a writing operation of causing a memory element to memorize and retain a data signal output from the first data signal providing unit 12, and a reading out operation of transferring a data signal retained by another memory element than the above memory element to the data driver 4.

The driving method according to this embodiment is repetition of the steps of reading out the data signal from the memory unit 3, transferring the data signal to the data driver 4, and further to the element array 2. During such process, the controller 9 is performing the writing operation by transferring the data signal from the first data signal providing unit 12 to the memory unit 3. Accordingly, once a multi-pass printing operation has been completed, the memory unit 3 retains a data signal necessary for the next step, i.e. the data signal to be transferred to the data driver 4, therefore the data driver 4 can immediately start reading out the data signal.

Also, the first data signal providing unit 12 can transfer the data signal during the operation of a frame, therefore a driving frequency for the data transference can be set relatively low. Therefore since the first data signal providing unit 12 is not required to perform a high-speed operation, a low-cost semiconductor device can be attained. Further, since the driving frequency can be set relatively low, power consumption of the entire device can be lowered.

Embodiment A5

Figure 11:
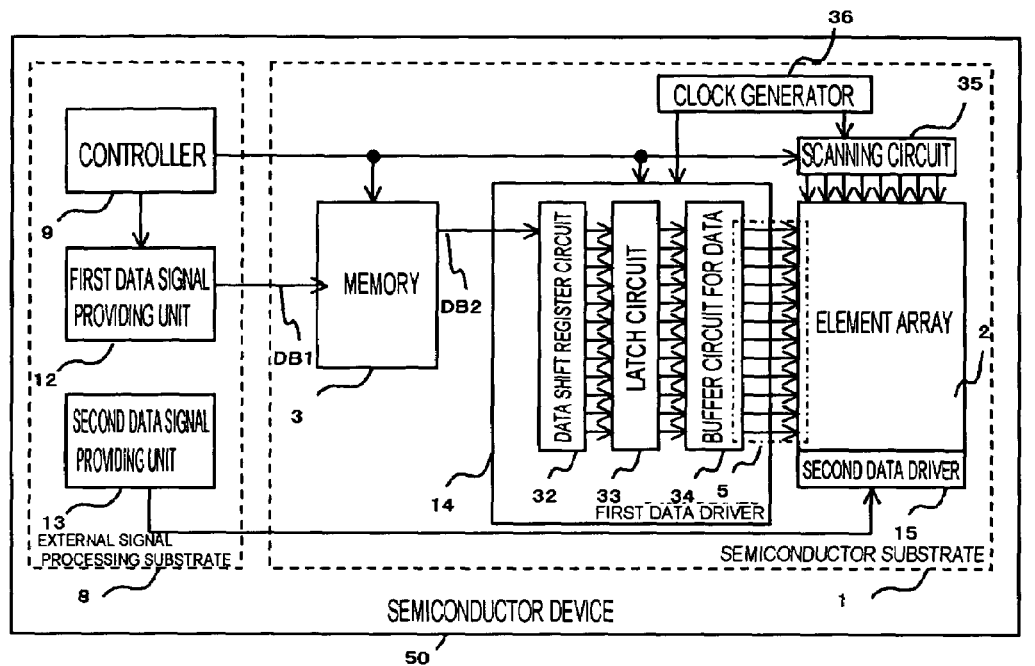
FIG. 11 is a block diagram showing a configuration of a semiconductor device according the embodiments A5 and A6 of the invention.

FIG. 11 is a block diagram showing a configuration of a semiconductor device 50 according the embodiments A5. Hereafter, distinctive feature of this embodiment shall be described, omitting the description on components that have the same functions as those in the embodiments A1 through A4 as the case may be. In the embodiment A5, the function of the selection circuit 43, which serves for selecting an analog signal in the embodiment A4, is granted to a second data driver 15 in the element array 2. Accordingly, the data driver 4 in the embodiment A4 from which the selection circuit 43 has been removed shall be referred to as a first data driver 14.

Figure 12:
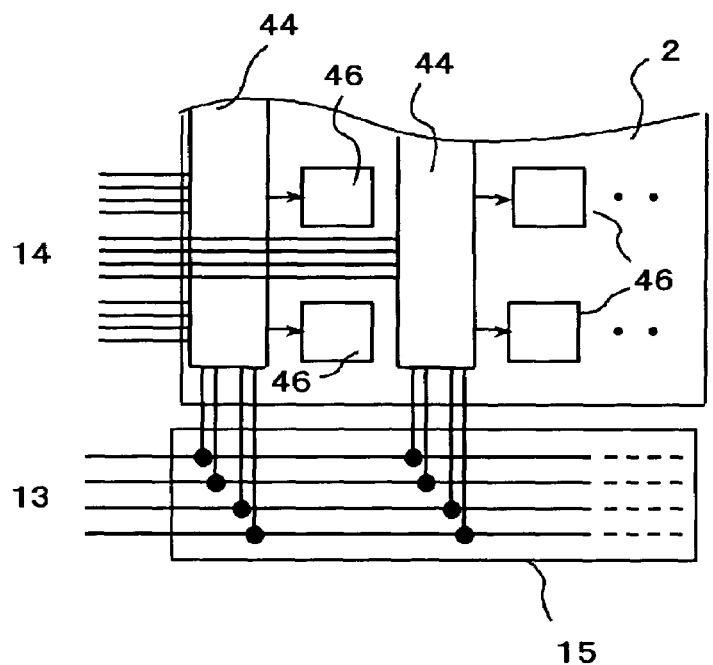
FIG. 12 is a block diagram showing a configuration of an element array and a second data driver according the embodiments A5 and A6 of the invention.

FIG. 12 is a block diagram showing a configuration of the element array 2 and the second data driver 15. The second data driver 15 distributes an analog signal line extending from the second data signal providing unit 13 for providing the second data signal to a selector 44 disposed on each row for the functional element 46 provided in the element array 2. In the drawing there are four analog signal lines, therefore the analog signal has four waveforms.

Figure 13:
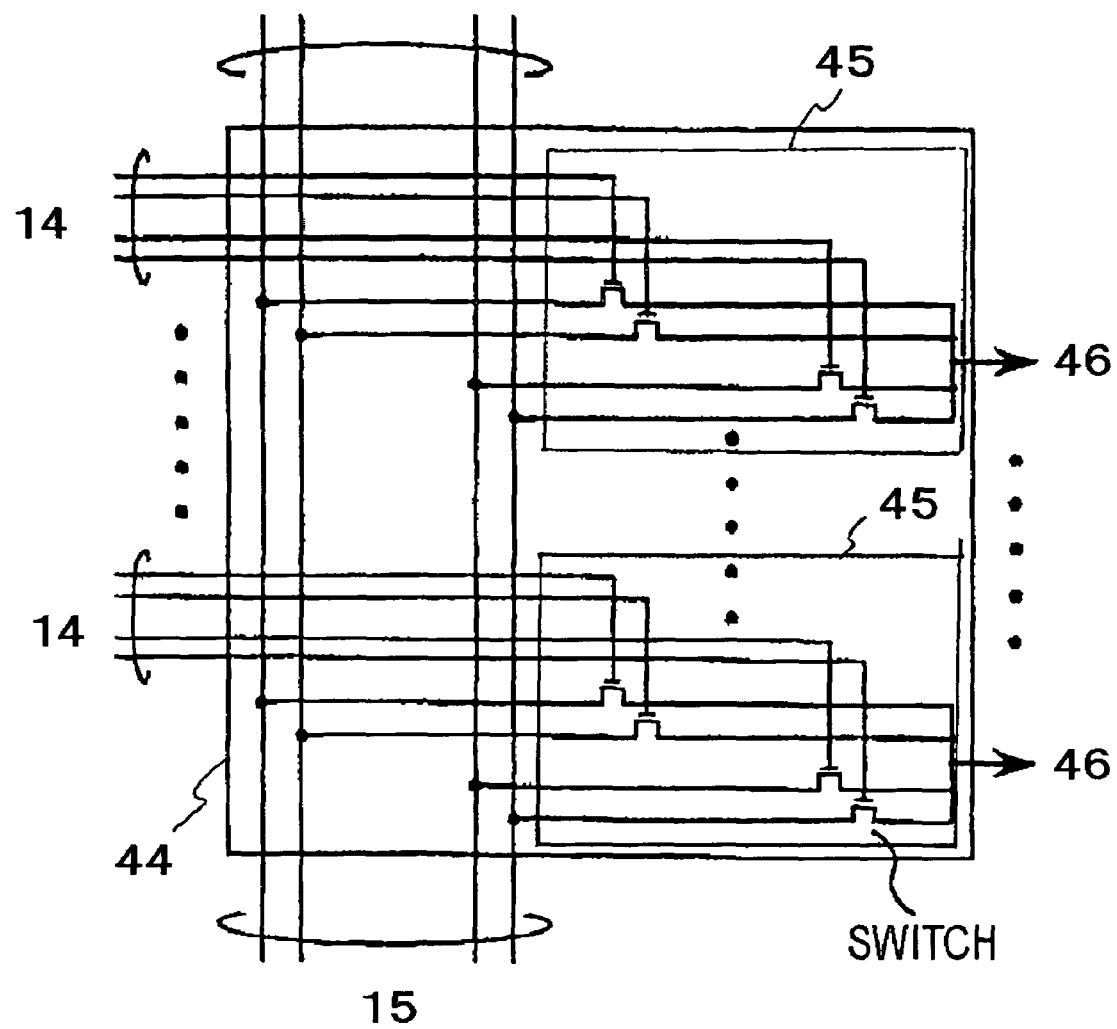
FIG. 13 is a block diagram showing a configuration of a selector according the embodiments A5 and A6 of the invention.

FIG. 13 shows a configuration of the selector 44. The selector 44 is provided with a merging unit 45 for selecting and merging a desired signal from the four analog signal lines and transferring the merged signal to the functional element 46. The merging unit 45 is provided with a transistor controlled by a signal input from the first data driver 14 for serving as a switch, disposed on the respective analog lines.

Here, the first data signal is a digital signal by which to select an analog signal to be provided to the element array 2. Also, the second data signal includes analog signals having a plurality of types of waveforms to be provided to the element array 2. Also, the memory unit 3 includes at least memory elements for retaining the digital signal for a certain period and a driving circuit for driving such memory elements. Further, the first data driver 14 transfers the first data signal output from the memory unit 3 to the element array 2, and the second data driver 15 transfers the second data signal output from the second data provider 13 to the element array 2.

Also, to the element array 2, at least one data signal out of a plurality of electric signals output from the first data driver 14, i.e. a plurality of first data signals, is input through the data bus line 5.

Also, the controller 9 controls the memory unit 3 and the first data driver 14. Here, FIG. 11 is merely a single example of possible configurations of the semiconductor device 50, and the controller 9 for example, which is installed in the external signal processing substrate 8 in FIG. 11, can be installed on the side of the semiconductor substrate 1.

Operation of the semiconductor device 50 constituted as above shall now be described hereunder. The first data signal output from the first data signal providing unit 12 is input to the memory unit 3 and retained therein. The data signal retained in the memory unit 3 is transferred to the first data driver 14.

The data signal transferred to the first data driver 14 is converted into a parallel signal at the data shift register circuit 32, and transferred from the latch circuit 33 at a desired timing to the element array 2 through the data buffer circuit 34.

Meanwhile, the second data signal, which is a plurality of analog signals output from the second data signal providing unit 13 is transferred to the second data driver 15. Then the second data signal is also input to the element array 2, by the second data driver 15. In the element array 2, at least one analog signal is selected by the first data signal out of the plurality of analog signals, so that the element array 2 performs a desired operation according to the selected analog signal.

Consequently, according to this embodiment, a distinction from the embodiments A1 and A2 is that at least one analog signal is selected out of a plurality of analog signals according to the first data signal in the element array 2 so that the element array 2 performs a desired operation, instead of transferring the data signal read out from the memory unit 3 to the element array 2.

According to this embodiment A5, similar advantage to that achieved by the embodiments A1 through A4 can be attained. Further, an analog signal can be input to the element array 2.

Embodiment A6

The constitution of the semiconductor according to this embodiment is identical to that of the embodiment A5, i.e. to the configuration shown in FIG. 11. Since difference from the semiconductor device described as the embodiment A5 lies in driving method, only the driving method according to this embodiment shall be described hereunder. However, different aspects between the driving method of the embodiment A5 and that of this embodiment are the same as between the embodiments A1 and A2, and between the embodiments A3 and A4.

Here, the memory unit 3 according to this embodiment is capable of simultaneously performs a writing operation of causing a memory cell 22 to memorize and retain a data signal output from the first data signal providing unit 12, and a reading out operation of transferring a data signal retained by another memory cell 22 than the above memory cell 22 to the second data driver 15.

The driving method according to this embodiment is repetition of the steps of reading out the data signal from the memory unit 3, transferring the data signal to the first data driver 14, and further to the element array 2. During such process, the first data signal providing unit 12 is transferring the data signal to the memory unit 3 and the memory unit 3 is performing the writing operation. Accordingly, once a multi-pass printing operation has been completed, the memory unit 3 retains a data signal necessary for the next step, i.e. the data signal to be transferred to the data driver 4, therefore the data driver 4 can immediately start reading out the data signal.

Accordingly, once the operation has been completed, the memory unit 3 retains a data signal required for the next step, therefore the first data driver 14 can immediately start reading out the data signal.

Also, the first data signal providing unit 12 can transfer the data signal during the operation, therefore a driving frequency for the data transference can be set relatively low. Therefore since the first data signal providing unit 12 is not required to perform a high-speed operation, a low-cost semiconductor device can be attained. Further, since the driving frequency can be set relatively low, power consumption of the entire device can be lowered.

Embodiment A7

Figure 14:
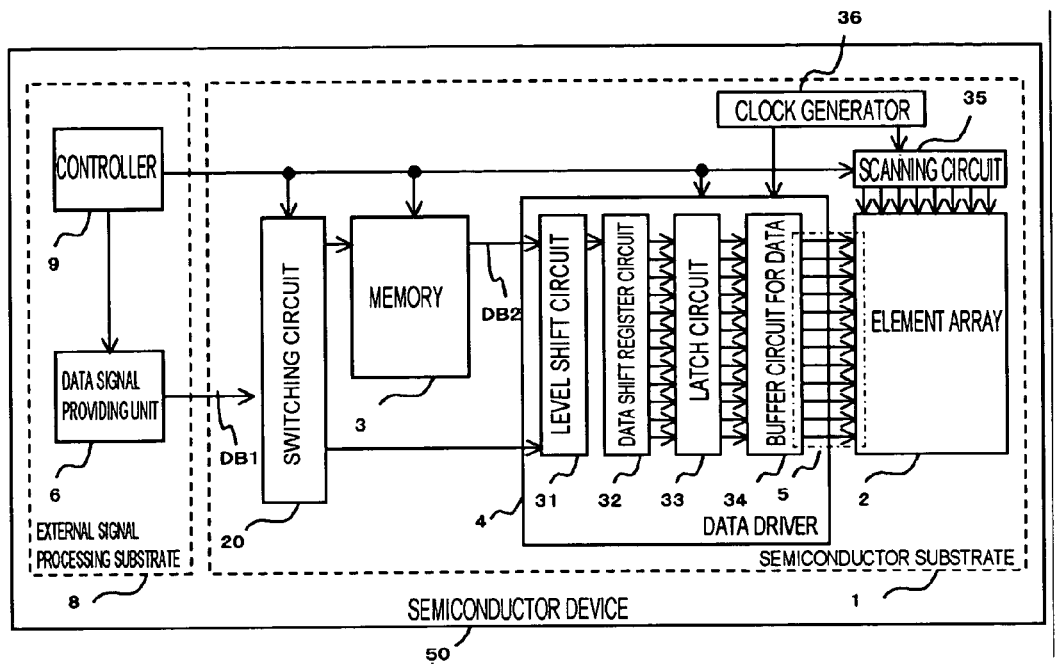
FIG. 14 is a block diagram showing a configuration of a semiconductor device according the embodiment A7 of the invention.

FIG. 14 is a block diagram showing a configuration of the semiconductor device 50 according the embodiment A7. The semiconductor device 50 is basically constituted of two substrates, namely the semiconductor substrate 1 and the external signal processing substrate 8. The semiconductor substrate 1 is provided with a switching circuit 20, the memory unit 3, the data driver 4, the element array 2, the scanning circuit 35 and the clock generator 36. The external signal processing substrate 8 is provided with the data signal providing unit 6 and the controller 9. Therefore, the semiconductor device 50 according to this embodiment has the same constitution as the embodiments A1 and A2, but with an addition of the switching circuit 20. All other components are identical to those shown in FIG. 1, therefore description thereof shall be omitted.

Figure 15:
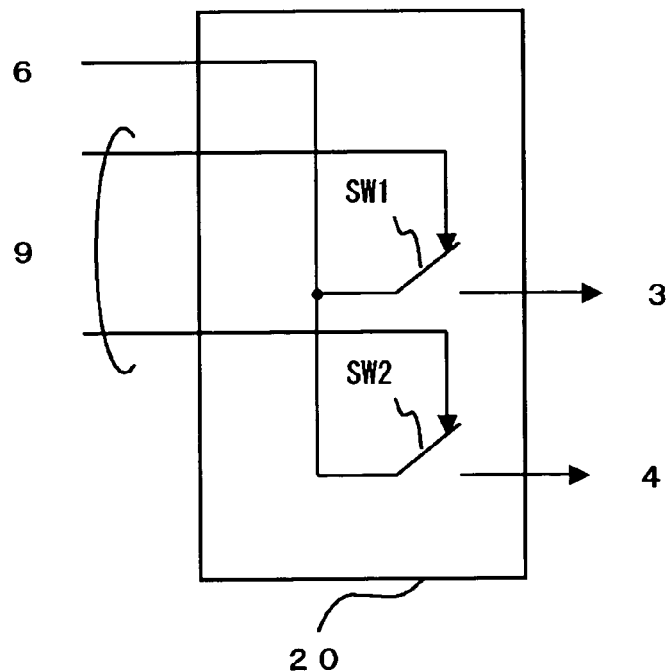
FIG. 15 is a block diagram showing a configuration of a switching circuit according the embodiment A7 of the invention.

FIG. 15 shows a configuration of the switching circuit 20. The switching circuit 20, provided with a first switch SW1 and a second switch SW2, is controlled by the controller 9 so as to determine to which of the memory unit 3 or the level shift circuit 31 in the data driver 4 to transfer the data signal output from the data signal providing unit 6. The switching circuit 20 may be constituted in any way as long as it can perform the mentioned function. In case where the data signal output from the data signal providing unit 6 is identical to the one to be eventually used repeatedly in the element array 2, the data signal is transferred to the memory unit 3, while otherwise the data signal is directly transferred to the data driver 4.

Also, the controller 9 controls the memory unit 3, the data driver 6 and the switching circuit 20. Here, FIG. 14 is merely a single example of possible configurations, and the controller 9 for example, which is installed in the external signal processing substrate 8 in FIG. 14, can be installed on the side of the semiconductor substrate 1.

Consequently, referring to the semiconductor device 50 according to this embodiment, the data signal can be directly transferred to the data driver 4 without passing through the memory unit 3 because of the operation of the switching circuit 20, with respect to a region where the data signal retained in the memory unit 3 is not repeatedly read out. Therefore power consumption of the semiconductor device 50 can be lowered by suspending the operation of the memory unit 3.

Embodiment A8

Figure 16:
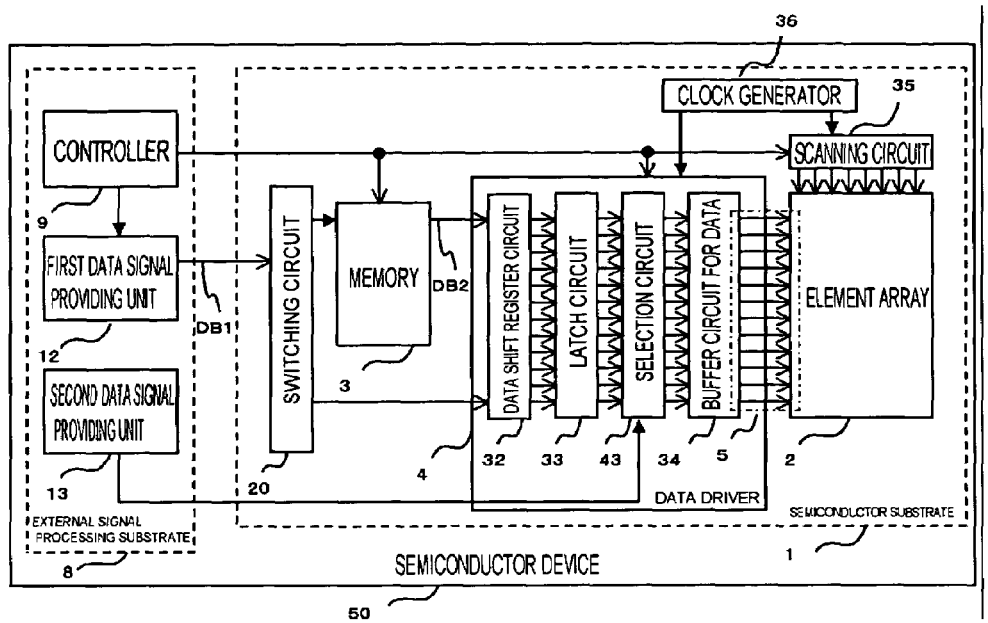
FIG. 16 is a block diagram showing a configuration of a semiconductor device according the embodiment A8 of the invention.

FIG. 16 is a block diagram showing a configuration of the semiconductor device 50 according the embodiment A8. A distinctive feature of the semiconductor device 50 according to this embodiment is the addition of the switching circuit 20, to the semiconductor device 50 according to the embodiment A3 or A4.

The semiconductor device 50 comprises the semiconductor substrate 1 and the external signal processing substrate 8. The semiconductor substrate 1 is provided with a switching circuit 20, the memory unit 3, the data driver 4, the element array 2, the scanning circuit 35 and the clock generator 36. The external signal processing substrate 8 is provided with the controller 9, the first data signal providing unit 12 and the second data signal providing unit 13.

The configuration of the switching circuit 20 is identical to FIG. 15. However, while the second switch SW2 is connected with the level shift circuit 31 in the embodiment A7, the second switch SW2 is connected with the data shift register circuit 32 in this embodiment. The first switch SW1 and the second switch SW2 are controlled by the controller 9, in such a manner that when the first switch SW1 is turned on the data signal is provided to the memory unit 3, and when the second switch SW2 is turned on the data signal is provided to the data driver 4. In other words, the switching circuit 20 determines to which of the memory unit 3 or the data shift register circuit 32 in the data driver 4 to transfer the data signal output from the first data signal providing unit 12. Also, the controller 9 controls the first data signal providing unit 12, the memory unit 3, the data driver 4 and the switching circuit 20. Here, FIG. 16 is merely a single example of possible configurations, and the controller 9 for example, which is installed in the external signal processing substrate 8 in FIG. 16, can be installed on the side of the semiconductor substrate 1.

Referring to the semiconductor device 50 according to this embodiment, the data signal to be input to the element array 2 can be directly transferred to the data driver 4 without passing through the memory unit 3 because of the operation of the switching circuit 20, during a period in which the data signal retained in the memory unit 3 is not repeatedly readout. Therefore the memory unit 3 can, beyond just being exempted from a high-speed operation, suspend an entire operation.

Embodiment A9

Figure 17:
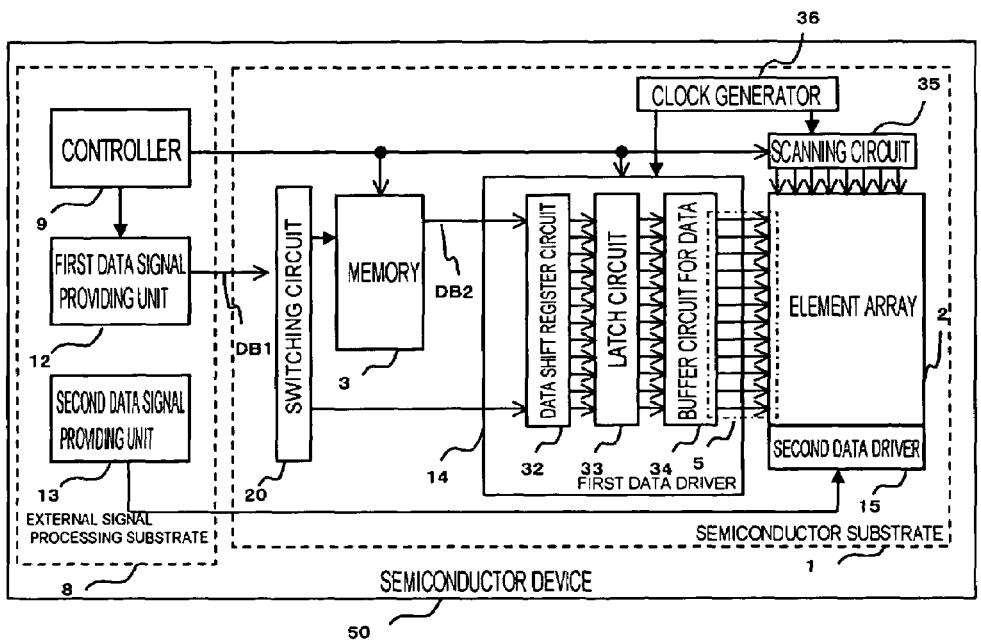
FIG. 17 is a block diagram showing a configuration of a semiconductor device according the embodiment A9 of the invention.

FIG. 17 is a block diagram showing a configuration of the semiconductor device 50 according the embodiment A9. A distinctive feature of the semiconductor device 50 according to this embodiment is the addition of the switching circuit 20, to the semiconductor device 50 according to the embodiment A5 or A6.

The semiconductor device 50 comprises the semiconductor substrate 1 and the external signal processing substrate 8. The semiconductor substrate 1 is provided with a switching circuit 20, the memory unit 3, the first data driver 14, the second data driver 15, the element array 2, the scanning circuit 35 and the clock generator 36. The external signal processing substrate 8 is provided with the controller 9, the first data signal providing unit 12 and the second data signal providing unit 13.

Here, the switching circuit 20 determines to which of the memory unit 3 or the data shift register circuit 32 in the first data driver 14 to transfer the data signal output from the first data signal providing unit 12. Also, the controller 9 controls the memory unit 3, the first data driver 14, the switching circuit 20 and the first data signal providing unit 12. Here, FIG. 17 is merely a single example of possible configurations, and the controller 9 for example, which is installed in the external signal processing substrate 8 in FIG. 17, can be installed on the side of the semiconductor substrate 1.

Referring to the semiconductor device 50 according to this embodiment, the data signal to be input to the element array 2 can be directly transferred to the data driver 4 without passing through the memory unit 3 because of the operation of the switching circuit 20, during a period in which the data signal retained in the memory unit 3 is not repeatedly readout. Therefore the memory unit 3 can suspend an entire operation, beyond just being exempted from a high-speed operation.

Embodiment B1

This embodiment relates to an image output device, particularly to a printing device. The printing device has a similar constitution to that of the embodiments A1 through A9, therefore only distinctive feature shall be described hereunder, partly omitting the description on other aspects. Also, in a printing device popularly called as thermal inkjet type, a digital signal is input to a thermal resistance element corresponding to the element array 2. On the other hand, in a printing device of a so-called piezoelectric inkjet type, an analog signal is input to an piezoelectric element corresponding to the element array 2.

Therefore, it is the thermal inkjet type printing device that the configuration of the semiconductor device shown in the embodiments A1 and A2 is to be applied to, while it is the piezoelectric inkjet type printing device that the configuration of the semiconductor device shown in the embodiments A3 through A9 is to be applied to. Herein, the application of the configuration of the semiconductor device 50 according to the embodiment A3 to the piezoelectric inkjet type printer shall be described. In addition, constitutions wherein the semiconductor device 50 according to any of the other embodiments A1, A2 and A4 through A9 is applied to a printing device shall also be effectively included in the invention.

As described earlier, there has been a growing demand in the field of inkjet printer for a higher speed printing performance and higher print quality. For such purpose it is necessary to increase an operation frequency of a printhead, however it often incurs an increase of power consumption, therefore reduction of power consumption is also a problem to solve as in the case of the semiconductor device 50. Also, for increasing a printing speed it is necessary to increase a traveling speed of the printhead. Now, micronization of the printhead is advantageous since it makes it easier to design a constitution of a printhead driving mechanism that can stand a higher speed driving. Further, higher degree of freedom is granted in designing a printing device.

Figure 18:
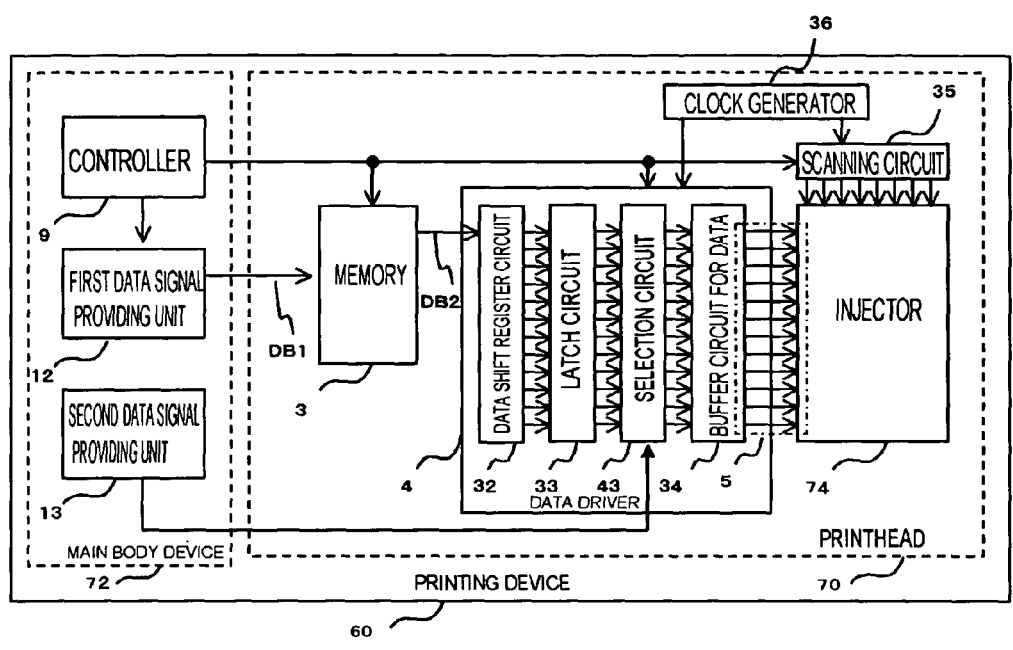
FIG. 18 is a block diagram showing a configuration of a printing device according the embodiment B1 of the invention.

FIG. 18 is a block diagram showing a configuration of a printing device 60 to which the constitution of the semiconductor device 50 according the embodiment A3 is applied. The semiconductor substrate 1 corresponds to a printhead 70, and the external signal processing substrate 8 to a main body device 72. Also, the element array 2 corresponds to an injector 74. The printing device 60 performs piezoelectric inkjet printing, since an analog signal is input to the injector 74 as mentioned earlier. In this example, the injector 74 is provided with piezoelectric elements aligned in a matrix form.

Figure 19:
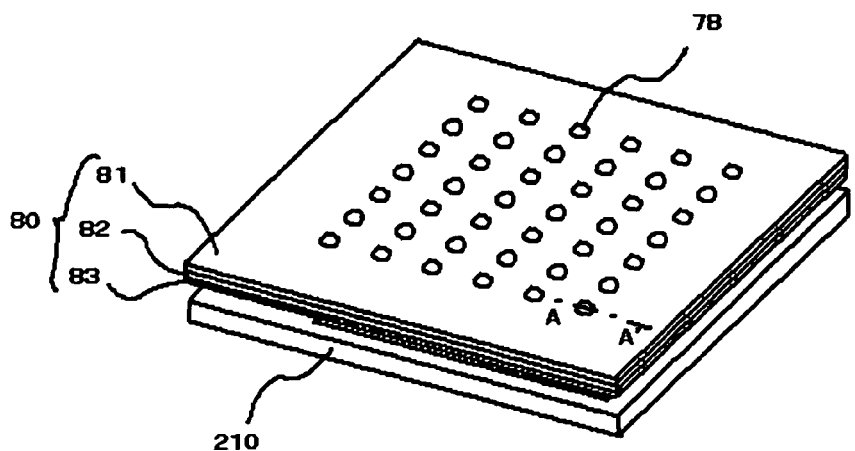
FIG. 19 is a perspective view showing a configuration of a printhead according the embodiment B1 of the invention.
Figure 20:
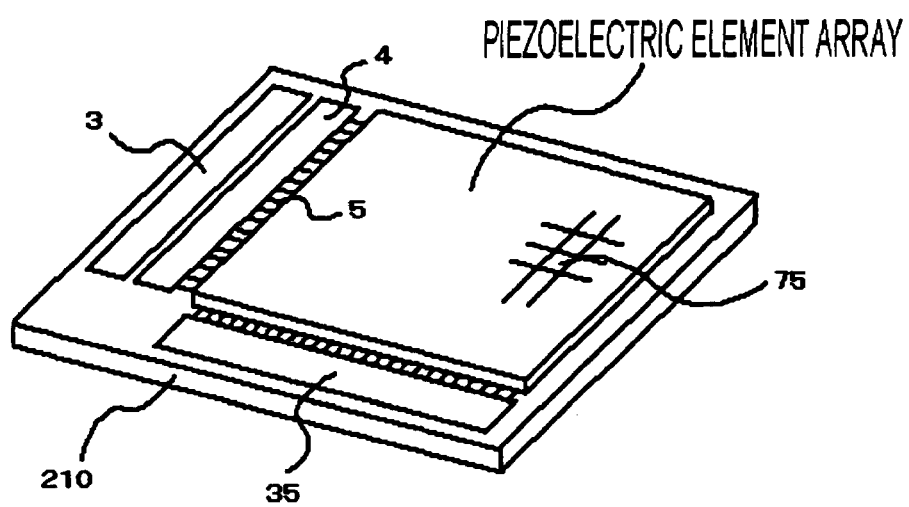
FIG. 20 is a perspective view showing a configuration of a glass substrate provided in the printhead according the embodiment B1 of the invention.
Figure 21:
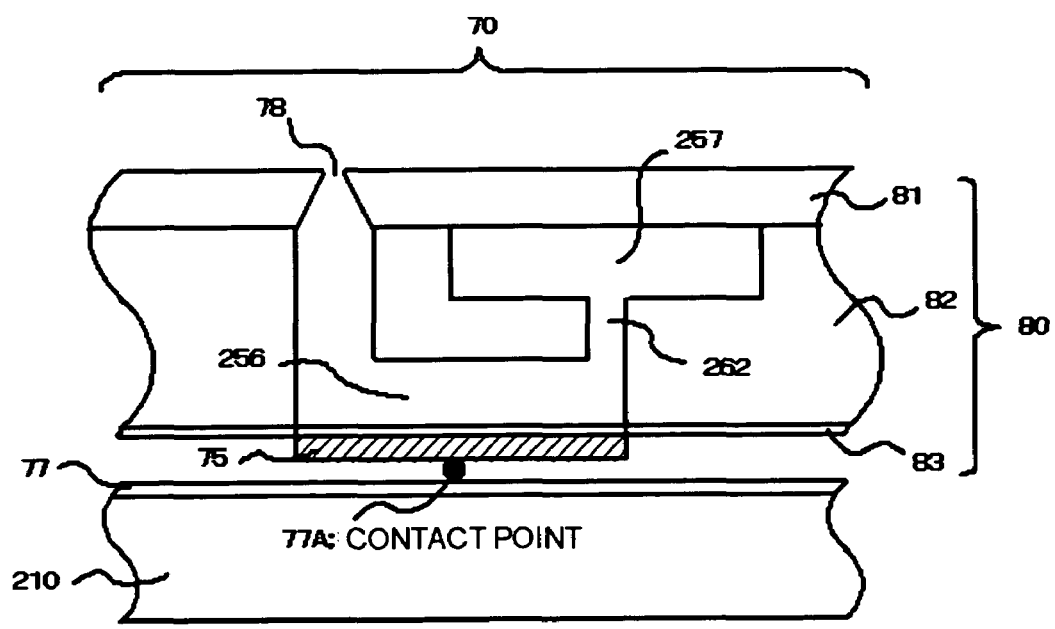
FIG. 21 is a cross-sectional view taken along the line A–A' of the printhead shown in FIG. 19.

Also, FIG. 19 shows a configuration of the printhead 70. FIG. 20 shows a configuration of a glass substrate 210 provided in the printhead 70. And FIG. 21 is a cross-sectional view taken along the line A–A' of the printhead shown in FIG. 19.

The printhead 70 is provided with an injection unit 80, a piezoelectric element 75 and a glass substrate 210. However the piezoelectric element 75 is interleaved between the injection unit 80 and the glass substrate and is therefore omitted in FIG. 19. Also, the injection unit 80 comprises a plate-shape component 81 (hereinafter referred to as "nozzle plate") having a number of small perforations 78 serving as a nozzle, a pressure chamber structure member 82 and a vibrating plate 83. On a surface of the glass substrate 210 where the piezoelectric element 75 for activating the vibrating plate 83 is packaged, a TFT circuit 77 for providing a driving electric signal to the piezoelectric element 75 is formed in a unified manner. Further, the memory unit 3, the data driver 4, the scanning circuit 35 and the clock generator 36 are provided in the TFT circuit 77.

Inside the frame constituting the pressure chamber structure member 82 a plurality of walls are installed with a predetermined gap between each other, forming a plurality of pressure chambers 256 defined by two confronting walls, the nozzle plate 81 and the vibrating plate 83.

Also, inside the pressure chamber structure member 82 an ink pool 257 is provided, from which ink is supplied to the pressure chamber through an ink outlet 262.

A plurality of the piezoelectric elements 75 is disposed on the vibrating plate 83 so as to correspond to the respective pressure chambers 256 through a connector 77A, and the small holes 78 are also perforated at a plurality of positions on the nozzle plate 81 so as to correspond to the respective pressure chambers 256.

However, in case where the printing device 60 is of a thermal inkjet type, the element array is constituted of a thermal resistance element, so that heat produced by the thermal resistance element generates a bubble, which causes the injection of the ink.

The printing device 60 constituted as above operates as described hereunder. The first data signal output from the first data signal providing unit 12 is input to the memory unit and retained therein. The data signal retained in the memory unit 3 is transferred to the data driver 4.

The data signal transferred to the data driver 4 is converted into a parallel signal at the data shift register circuit 32, and transferred from the latch circuit 33 at a desired timing to the selection circuit 43.

Meanwhile, the second data signal output from the second data signal providing unit 13 is transferred to the selection circuit 43 in the data driver 4. Then the second data signal designated by the first data signal in the selection circuit 43 is transferred to the element array 2 through the data buffer circuit 34. In the element array 2, the piezoelectric element 75 performs a desired operation according to the second data signal.

In case where multi-pass printing is to be performed, the controller 9 suspends the transference of the data signal from the first data signal providing unit 12 to the memory unit 3, and the data signal retained in the memory unit is not updated. The first data signal is read out from the memory unit 3 and is transferred to the selection circuit 43, where at least one second data signal is selected according to the first data signal out of the plurality of second data signals output from the memory unit 3, and then the selected second data signal is transferred to the element array 2. In this way the multi-pass printing is performed.

Embodiment B2

As the embodiment B2, the semiconductor device 50 according to the embodiments A1 and A2 is applied to a display device. An active matrix type organic EL display device is herein adopted as an example. This display device comprises TFT circuits disposed in a matrix form, each provided with an organic EL element. Only distinctive feature shall be described hereunder, omitting the description on other aspects as the case may be. In addition, constitutions wherein the semiconductor device 50 according to any of the other embodiments A3 through A9 is applied to a display device shall also be effectively included in the invention.

Figure 22:
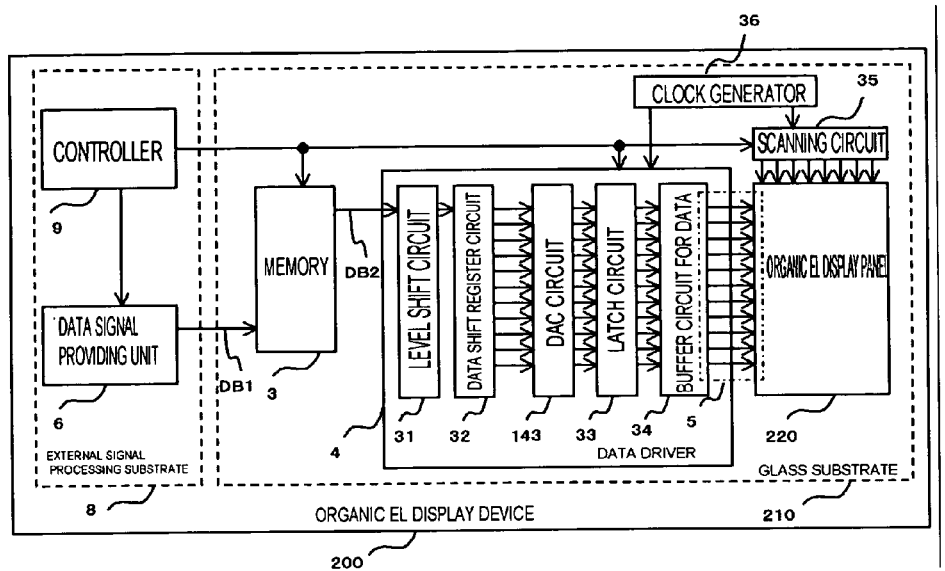
FIG. 22 is a block diagram showing a configuration of an organic EL display device according the embodiment B2 of the invention.

FIG. 22 is a functional block diagram showing a configuration of an organic EL display device 200. The organic display device 200 comprises the external signal processing substrate and the glass substrate 210. The glass substrate 210 corresponds to the semiconductor substrate 1 of the semiconductor device 50 according to the embodiments A1 through A9. In this embodiment, a DAC circuit 143 is provided between the data shift register circuit 32 and the latch circuit 33 in the constitution of the data driver 4 included in the semiconductor device 50 of FIG. 1, so that an analog signal is output to an organic EL display panel 220. In other words, the element array 2 is substituted with the organic EL panel 220.

Figure 23:
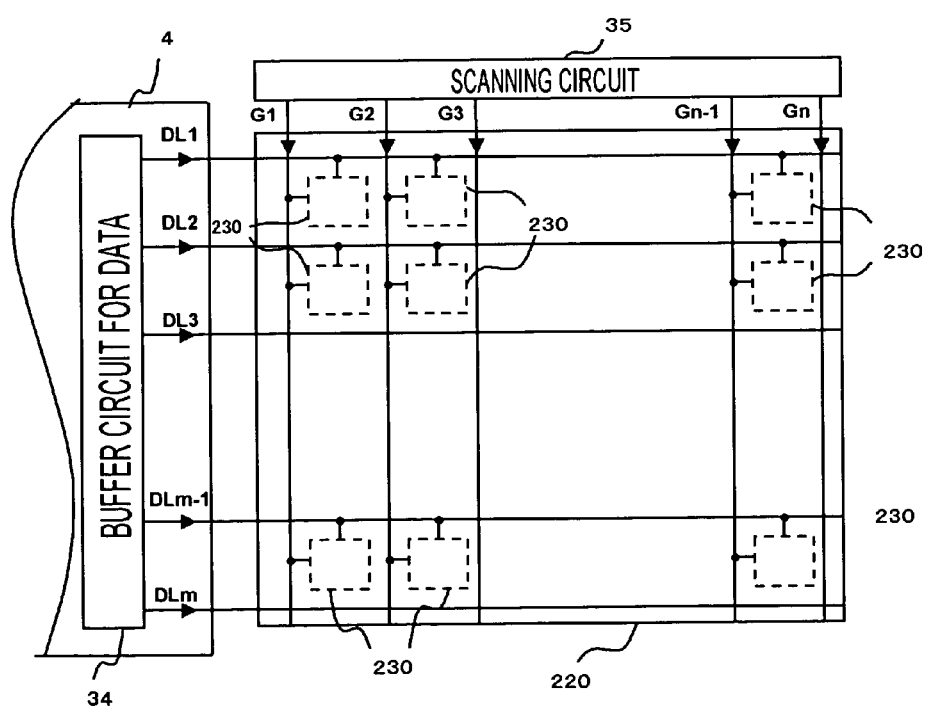
FIG. 23 is a block diagram showing a configuration of an organic EL display panel according the embodiment B2 of the invention.

FIG. 23 shows a configuration of the organic EL display panel 220. On the organic EL display panel 220, pixel circuits 230 are disposed in regions aligned in an M×N matrix form defined by N lines of scanning lines including a first scanning line G1 up to an Nth scanning line Gn, each extending from the scanning circuit 35, and by M lines of data lines including a first data line DL1 up to an Mth data line DLm, each extending from the data buffer circuit 34.

Figure 24:
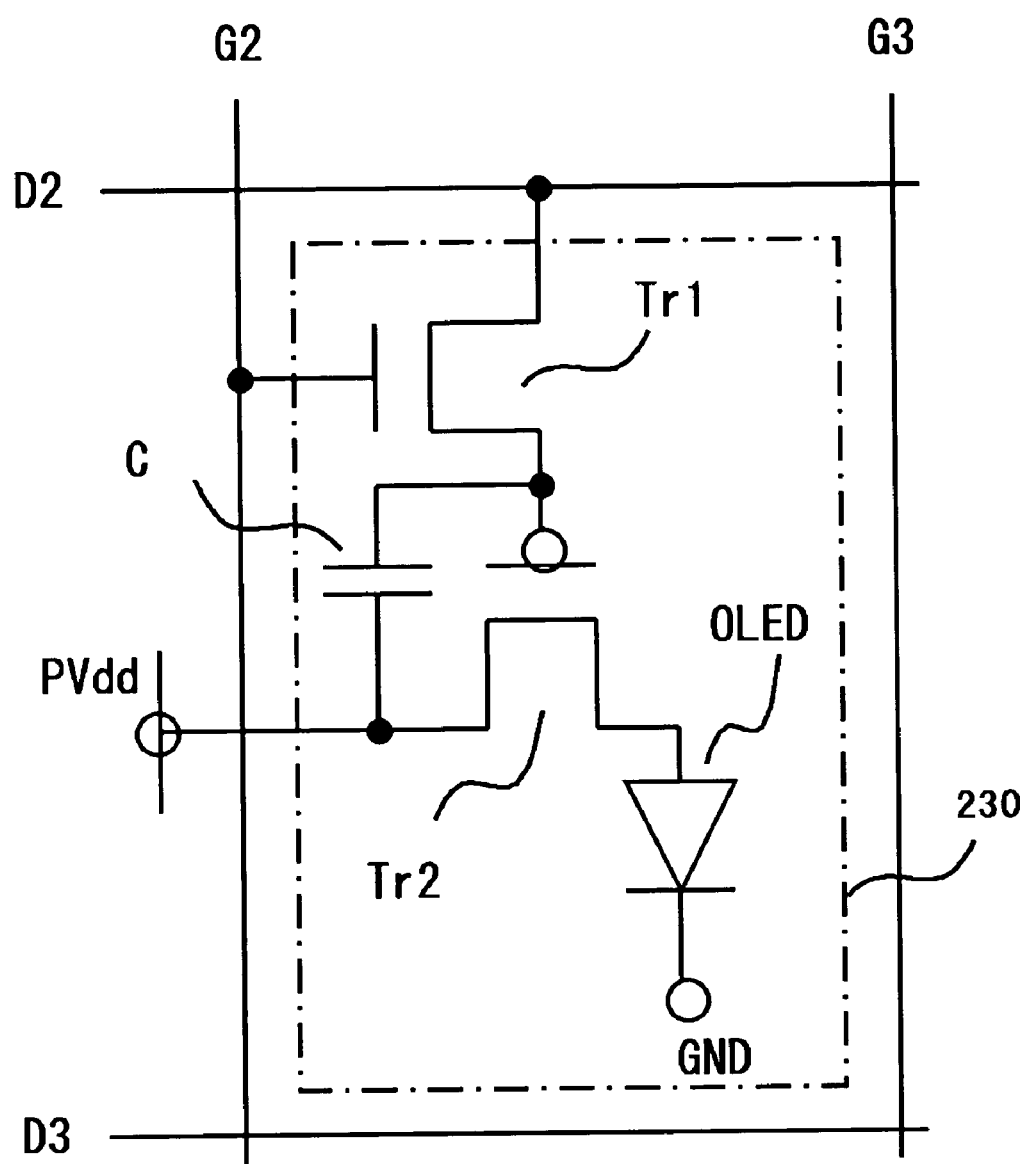
FIG. 24 is a circuit diagram showing a configuration of a single pixel constituting the organic EL display device according the embodiment B2 of the invention.

FIG. 24 is shows a typical configuration of one of the pixel circuits 230 disposed in a region defined by a second scanning line G2 and a third scanning line G3, and a second data line DL2 and a third data line DL3.

The pixel circuit 230 is provided with a selective transistor Tr1 that is an n-channel TFT, a driving transistor Tr2 that is a p-channel TFT and an organic EL element OLED. The selective transistor Tr1 serves as a switching circuit. The driving transistor Tr2 serves as a driving circuit for the organic EL element OLED.

The selective transistor Tr1 is connected in series between the second data line DL2 and a gate electrode of the driving transistor Tr2. Also, a gate electrode of the selective transistor Tr1 is connected to the second scanning line G2. A source electrode of the driving transistor Tr2 is connected to a source potential PVdd, and a drain electrode to a ground potential. Also, a holding capacitor C is provided between the driving transistor Tr2, the gate electrode and the source electrode.

When the second scanning line G2 is selected and rises to a high level, the selective transistor Tr1 is turned on so that the data signal input to the second data line DL2 is input to the gate electrode of the driving transistor Tr2. The driving transistor Tr2 supplies a current fed from the source potential PVdd according to the data signal retained in the gate electrode and the holding capacitor C, and thereby the organic EL element OLED emits desired light according to the supplied current.

Manufacturing Process

Figure 25:
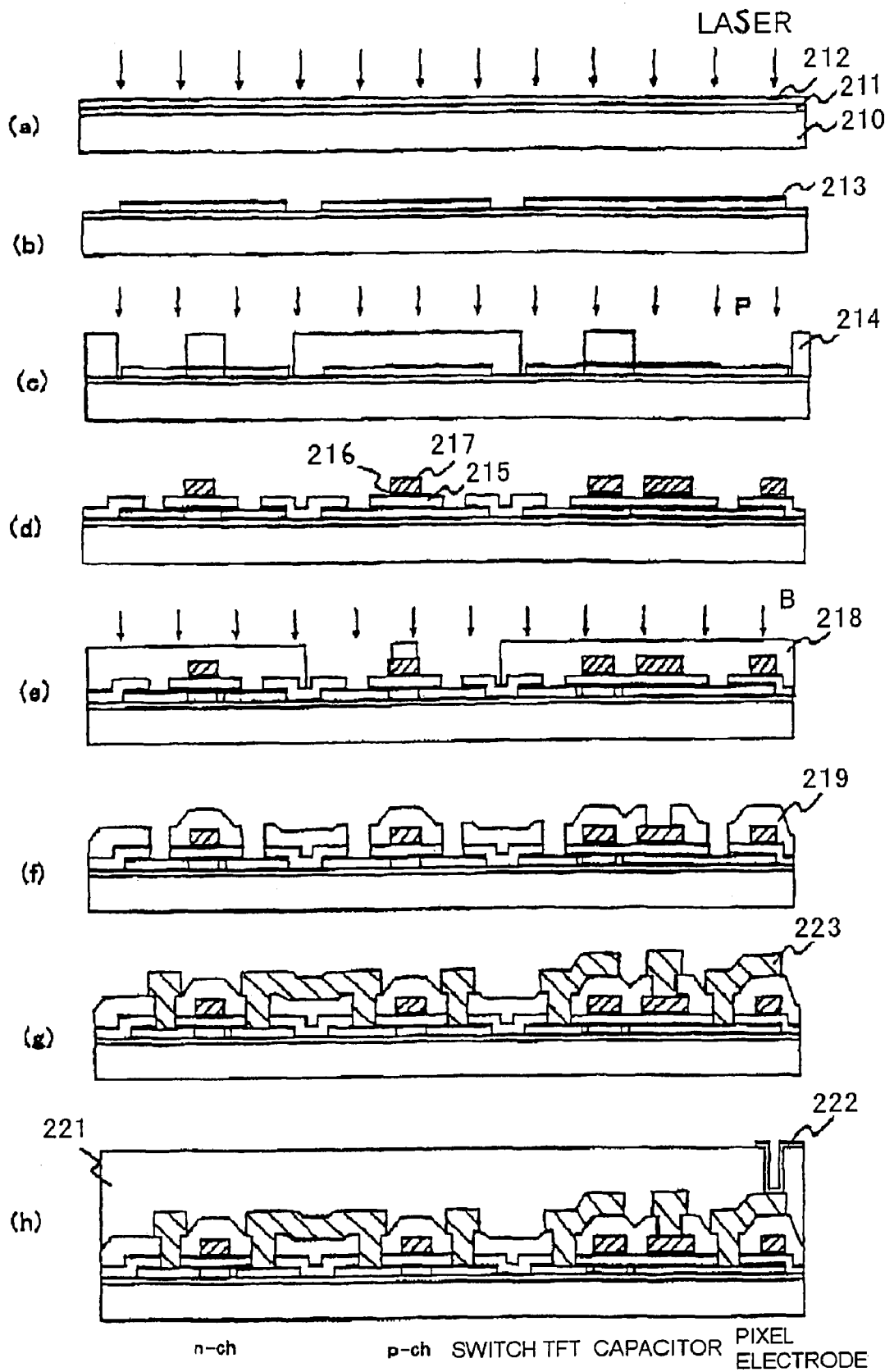
FIG. 25 includes cross-sectional views showing a manufacturing process of a TFT circuit in a manufacturing process of the printhead according the embodiment B1 of the invention.
Figure 26:
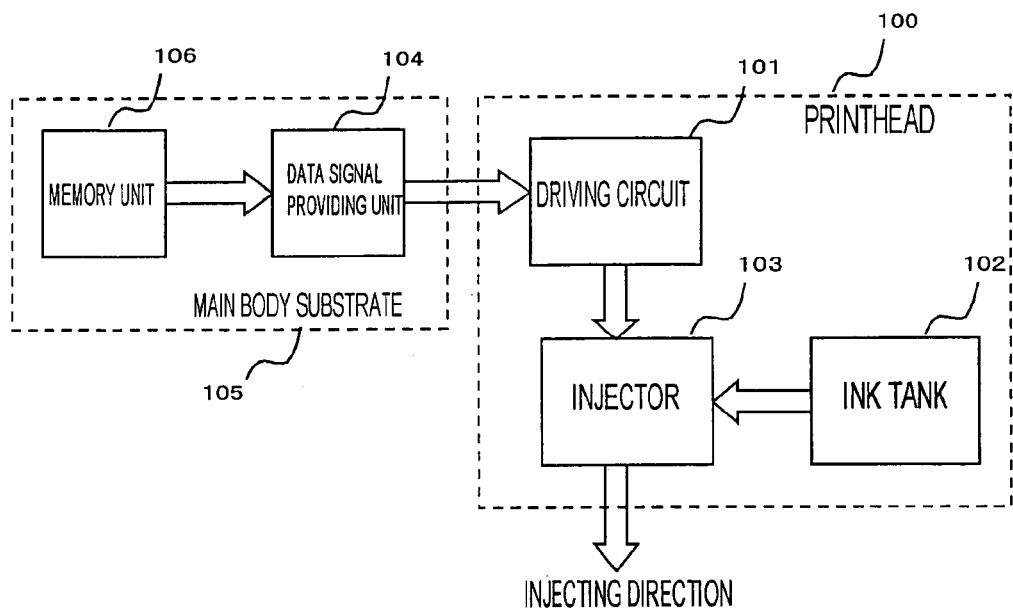
FIG. 26 is a block diagram showing a popular configuration of a conventional inkjet printer.
Figure 27:
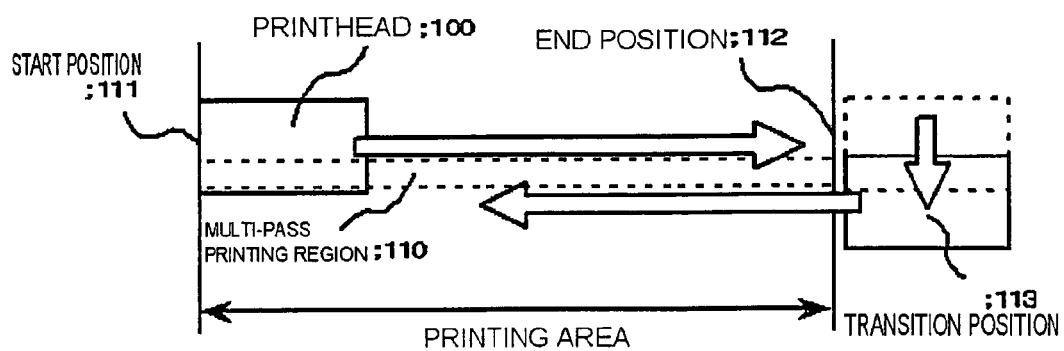
FIG. 27 is a schematic diagram showing a multi-pass printing operation of a printing device.
Figure 28:
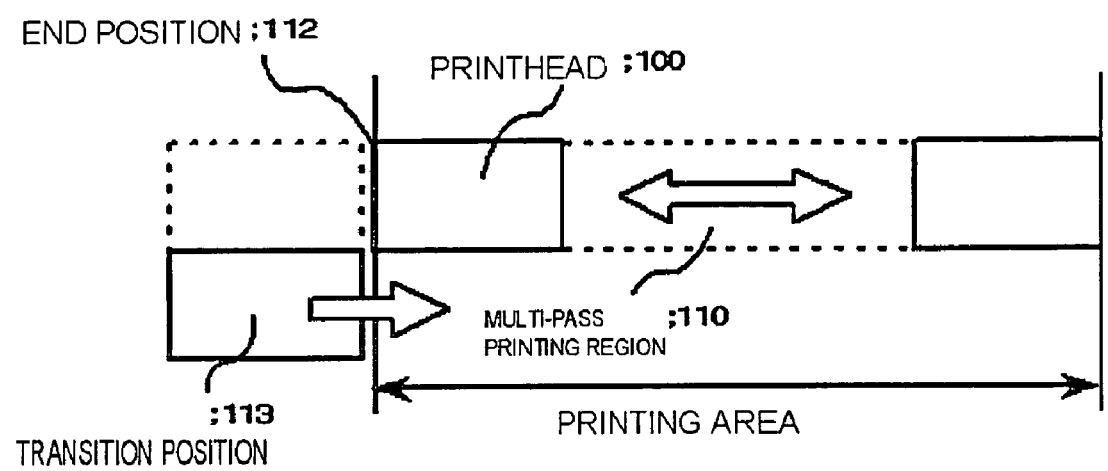
FIG. 28 is a schematic diagram showing another multi-pass printing operation of a printing device.

Referring to FIG. 25, manufacturing process of the TFT on the glass substrate 210 in the organic EL display device 200 shall be described. Here, main constituent of the printhead 70 are formed on the glass substrate. FIG. 25 shows a manufacturing process of a driving circuit and a memory unit utilizing polysilicon on the glass substrate.

Firstly, after forming a silicon oxide layer 211 on the glass substrate 210, amorphous silicon 212 is grown. And the amorphous silicon is annealed with an exima laser and turned to polysilicon (FIG. 25(*a*)).

Then a silicon oxide layer 213 of approx. 10 nm in thickness is grown, and after patterning (FIG. 25(*b*)) photoresist 214 is applied and patterning is performed (masking a p-channel region), and an n-channel source/drain region is formed through doping of phosphor ion (FIG. 25(*c*)).

Further, after growing a silicon oxide layer 215 of approx. 90 nm in thickness that serves as a gate dielectric layer, microcrystal silicon ($\mu$-c-Si) 216 and tungsten silicide (Wsi) 217 are grown for forming a gate electrode, and patterned into a gate shape (FIG. 25(*d*)).

The photoresist 218 is applied and patterned (masking an n-channel region) and a p-channel source/drain region is formed through doping of boron (FIG. 25(*e*)).

After successively growing a silicon oxide layer and a silicon nitride layer 219 a contact hole is opened (FIG. 25(*f*)), and aluminum and titan 223 are deposited by sputtering and then patterning is performed (FIG. 25(*g*)). By this patterning, source/drain electrodes of CMOS in a peripheral circuit, data line wiring for connection with a switch TFT drain that serves as a driving switch of the piezoelectric element, a contact with a pixel electrode, etc. are formed.

Following the above, a memory cell 221 of a dielectric layer is formed and a contact hole is opened, then a transparent electrode ITO (indium tin oxide) 222 is formed, which is to serve as the pixel electrode, and patterning is performed (FIG. 25(*h*)).

Through the above process the switch TFT of a planar structure is built, and a TFT array is formed.

In the peripheral circuit region, an n-channel TFT similar to the switch TFT and also a p-channel TFT are to be built, the latter of which is formed through a substantially same process to that of the n-channel TFT, but turned into a p-channel TFT by the boron doping.

In FIG. 25(*h*), the n-channel TFT in the peripheral circuit, the P-channel TFT in the peripheral circuit, the switch TFT (n-channel TFT), the holding capacitor and the pixel electrode are sequentially illustrated from the left.

In this embodiment an exima laser is employed for forming the polysilicon layer, while other types of lasers such as a successively oscillating CW laser may be employed, or solid phase growth by heat treatment may be performed.

As described above, the TFT circuit 77 constituted of polysilicon is formed on the glass substrate 210 through the process shown in FIG. 25.

Embodiment B3

In this embodiment, the semiconductor device according to the embodiments A1 through A9 is applied to an optical switch. Therefore, the element array 2, or more specifically the functional element provided in the element array 2 referred to in the embodiments A1 through A9 drives the optical switch in this embodiment.

The optical switch is broadly divided into a mechanical optical switch having a movable unit in its driving mechanism and an electronic optical switch based on a photoelectric effect. Manufacturing cost of an electronic optical switch is generally higher than that of a mechanical switch, therefore the mechanical optical switch is more popularly utilized. The mechanical optical switch, while having an advantage of lower loss and lower cross talk, is slow in response since response of the movable unit is controlled by mechanical on/off signals. Therefore, by applying the invention to a device for driving an optical switch, performance level of the entire device including the optical switch is upgraded, without making any change with the optical switch itself.

The invention has been described referring to some embodiments. It is to be understood that those embodiments are only exemplifying and that it is apparent to those skilled in the art that various modifications can be made to the respective constituents or processing steps or combinations thereof, without departing from the spirit and scope of the invention.

The constitutions described in the foregoing embodiments can be accomplished with a CPU, a memory unit or other LSI used in a popularly available computer in the aspect of hardware, and by a program loaded on a memory unit in the aspect of software, and accordingly the foregoing embodiments are providing functional blocks that can be achieved by a combination of such elements. Therefore it is apparent to those skilled in the art that these functional blocks can be achieved in various forms by hardware only or software only, or by a combination thereof.

As described above, according to the invention semiconductor device of lower power consumption is attained. Also, from another viewpoint a low-cost, high-speed semiconductor device is achieved. From still another viewpoint, an image output device of lower power consumption is achieved. Further, cost increase is restrained when performance level of an image output device is upgraded.

What is claimed is:

1. A semiconductor device comprising:
    a memory unit having a plurality of addresses for temporarily storing a data signal;
    a data signal providing unit for providing said data signal directly to said memory unit;
    a driving unit for generating a control signal for controlling a functional element based on said data signal read out from said memory unit and providing said control signal to said functional element; and
    a data-update control unit for successively providing an identical data signal over a plurality of times from an identical address in said memory unit.

2. The semiconductor device as set forth in claim 1, wherein said data-update control unit causes said data signal providing unit to suspend the operation of providing a data signal, in order to keep said data signal stored in said memory unit from being updated when successively providing the identical data signal to said functional element.

3. The semiconductor device as set forth in claim 1, wherein said data-update control unit causes said data signal providing unit to shut off a data signal transmission route from said data signal providing unit to said memory unit, in order to keep said data signal stored in said memory unit from being updated when successively providing the identical data signal to said functional element.

4. A semiconductor device comprising:
a memory unit having a plurality of addresses for temporarily storing a data signal;
a driving unit for selecting a control signal input from outside for controlling a functional element based on said data signal read out from said memory unit and providing said control signal to said functional element; and
a data-update control unit for successively providing an identical signal over a plurality of times from an identical address in said memory unit.

5. A semiconductor device comprising:
a memory unit having a plurality of addresses for temporarily storing a data signal;
a first driving unit for outputting to a functional element a signal for selecting, based on said data signal read out from said memory unit, a control signal input from outside for controlling said functional element;
a second driving unit for providing said control signal to said functional element; and
a data-update control unit for successively providing an identical signal over a plurality of times from an identical address in said memory unit.

6. The semiconductor device as set forth in claim 1, wherein said driving unit and said memory unit constitute a combined unit.

7. The semiconductor device as set forth in claim 4, wherein said driving unit and said memory unit constitute a combined unit.

8. The semiconductor device as set forth in claim 5, wherein said driving unit and said memory unit constitute a combined unit.

9. The semiconductor device as set forth in claim 1, wherein said driving unit, said functional element and said memory unit constitute a combined unit.

10. The semiconductor device as set forth in claim 4, wherein said driving unit, said functional element and said memory unit constitute a combined unit.

11. The semiconductor device as set forth in claim 5, wherein said driving unit, said functional element and said memory unit constitute a combined unit.

12. The semiconductor device as set forth in claim 1, further comprising:
a first signal transferring unit for transferring said data signal to said memory unit from a host device that provides said data signal to the semiconductor device;
a second signal transferring unit for transferring said data signal from said memory unit to said driving unit; wherein
a length of a route of said second signal transferring unit is shorter than a length of a route of said first transferring unit.

13. The semiconductor device as set forth in claim 4, further comprising:
a first signal transferring unit for transferring said data signal to said memory unit from a host device that provides said data signal to the semiconductor device;
a second signal transferring unit for transferring said data signal from said memory unit to said driving unit; wherein
a length of a route of said second signal transferring unit is shorter than a length of a route of said first transferring unit.

14. The semiconductor device as set forth in claim 5, further comprising:
a first signal transferring unit for transferring said data signal to said memory unit from a host device that provides said data signal to the semiconductor device;
a second signal transferring unit for transferring said data signal from said memory unit to said driving unit; wherein
a length of a route of said second signal transferring unit is shorter than a length of a route of said first transferring unit.

15. The semiconductor device as set forth in claim 1, further comprising a level converter for converting an amplitude of said data signal input to said memory unit to a desired amplitude.

16. The semiconductor device as set forth in claim 4, further comprising a level converter for converting an amplitude of said data signal input to said memory unit to a desired amplitude.

17. The semiconductor device as set forth in claim 5, further comprising a level converter for converting an amplitude of said data signal input to said memory unit to a desired amplitude.

18. The semiconductor device as set forth in claim 1, to which a serial signal is to be input, further comprising serial/parallel converter for converting the input serial data signal into a parallel signal.

19. The semiconductor device as set forth in claim 4, to which a serial signal is to be input, further comprising serial/parallel converter for converting the input serial data signal into a parallel signal.

20. The semiconductor device as set forth in claim 5, to which a serial signal is to be input, further comprising serial/parallel converter for converting the input serial data signal into a parallel signal.

21. The semiconductor device as set forth in claim 1, provided with a transference route of an O-phase parallel signal, further comprising:
a phase expanding unit for converting an O-phase parallel signal to a P-phase parallel signal.

22. The semiconductor device as set forth in claim 4, provided with a transference route of an O-phase parallel signal, further comprising:
a phase expanding unit for converting an O-phase parallel signal to a P-phase parallel signal.

23. The semiconductor device as set forth in claim 5, provided with a transference route of an O-phase parallel signal, further comprising:
a phase expanding unit for converting an O-phase parallel signal to a P-phase parallel signal.

24. The semiconductor device as set forth in claim 12, wherein at least one of said driving unit, said first signal transferring unit, said memory unit and said second signal transferring unit is constituted of a thin film transistor.

25. The semiconductor device as set forth in claim 13, wherein at least one of said driving unit, said first signal transferring unit, said memory unit and said second signal transferring unit is constituted of a thin film transistor.

26. The semiconductor device as set forth in claim 14, wherein at least one of said driving unit, said first signal transferring unit, said memory unit and said second signal transferring unit is constituted of a thin film transistor.

27. The semiconductor device as set forth in claim 24, wherein a semiconductor layer of said thin film transistor is constituted of polycrystalline silicon.

28. The semiconductor device as set forth in claim 25, wherein a semiconductor layer of said thin film transistor is constituted of polycrystalline silicon.

29. The semiconductor device as set forth in claim 26, wherein a semiconductor layer of said thin film transistor is constituted of polycrystalline silicon.

* * * * *